(12) United States Patent
Lund

(10) Patent No.: US 12,382,869 B2
(45) Date of Patent: Aug. 12, 2025

(54) ASPARAGUS LIFTING APPARATUS WITH INTERFERING MEMBERS, ASPARAGUS COLLECTION AND STORAGE APPARATUS, AND ASPARAGUS HARVESTERS FORMED THEREWITH

(71) Applicant: William J. Lund, Seaside, OR (US)

(72) Inventor: William J. Lund, Seaside, OR (US)

( * ) Notice: Subject to any disclaimer, the term of this patent is extended or adjusted under 35 U.S.C. 154(b) by 841 days.

(21) Appl. No.: 17/680,849

(22) Filed: Feb. 25, 2022

(65) Prior Publication Data

US 2022/0248602 A1 Aug. 11, 2022

Related U.S. Application Data

(63) Continuation-in-part of application No. 17/344,776, filed on Jun. 10, 2021, which is a continuation of application No. 17/225,908, filed on Apr. 8, 2021, now Pat. No. 11,058,057, which is a continuation of application No. 16/931,920, filed on Jul. 17, 2020, now Pat. No. 10,993,372.

(51) Int. Cl.
| | |
|---|---|
| A01D 46/22 | (2006.01) |
| A01D 45/00 | (2018.01) |
| F16K 49/00 | (2006.01) |
| H05B 3/00 | (2006.01) |

(52) U.S. Cl.
CPC ........... *A01D 45/007* (2013.01); *A01D 46/22* (2013.01); *F16K 49/002* (2013.01); *H05B 3/0014* (2013.01); *H05B 2203/02* (2013.01)

(58) Field of Classification Search
CPC .............. A01D 2033/005; A01D 33/10; A01D 45/006; A01D 45/007; A01D 45/008; A01D 46/22; A01D 46/28; A01D 46/285; A01D 46/30; A01D 90/02
See application file for complete search history.

(56) References Cited

U.S. PATENT DOCUMENTS

| | | | | |
|---|---|---|---|---|
| 3,855,764 A | * | 12/1974 | Helbing | A01D 45/007 56/327.2 |
| 4,003,193 A | * | 1/1977 | Haws | A01D 45/007 56/327.2 |

(Continued)

FOREIGN PATENT DOCUMENTS

| | | | | | |
|---|---|---|---|---|---|
| DE | | 2845954 A | * | 4/1979 | ............. A01D 33/10 |

*Primary Examiner* — Adam J Behrens
(74) *Attorney, Agent, or Firm* — Parsons & Goltry, PLLC; Michael W. Goltry; Robert A. Parsons

(57) ABSTRACT

An asparagus harvester includes a chassis movable over a bed of growing asparagus. Spears above a selected height are severed at the ground by a severing assembly. A conveyor receives from a pick-up apparatus and conveys away the severed asparagus spears to bin. In one embodiment, counter-rotating rollers of the pick-up apparatus have interfering members configured to disable the severed asparagus spears when being engaged and lifted by and between them from passing outwardly from between their trailing ends. In another embodiment, a partition in the bin cooperates with it to define a confined volume open to receive severed asparagus spears from the conveyor. A drive assembly actuates to displace the bin relative to the partition to increase the confined volume to enable it to accept more severed asparagus spears each time a sensor senses severed asparagus spears at a fill level of the confined volume.

23 Claims, 31 Drawing Sheets

(56) References Cited

U.S. PATENT DOCUMENTS

| | | | | |
|---|---|---|---|---|
| 4,480,430 A | * | 11/1984 | Wahls | A01D 45/007 56/327.2 |
| 4,512,145 A | * | 4/1985 | Lund | A01D 45/007 56/327.2 |
| 4,918,909 A | * | 4/1990 | Salkeld | A01D 45/007 56/327.2 |
| 9,851,020 B2 | * | 12/2017 | Fahrner | B64D 15/04 |
| 2006/0045724 A1 | * | 3/2006 | Alsobrook | A01D 90/02 414/789.7 |

* cited by examiner

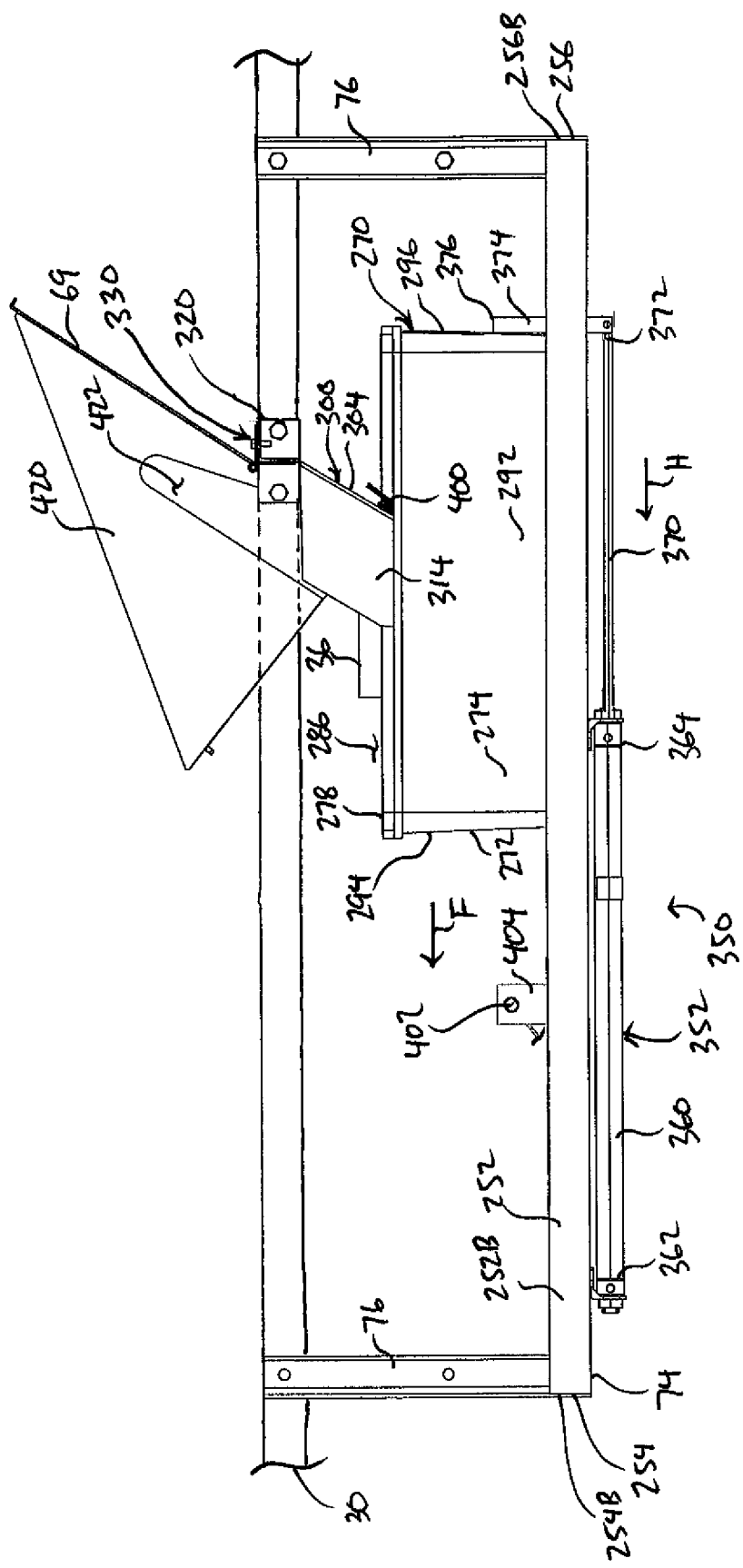

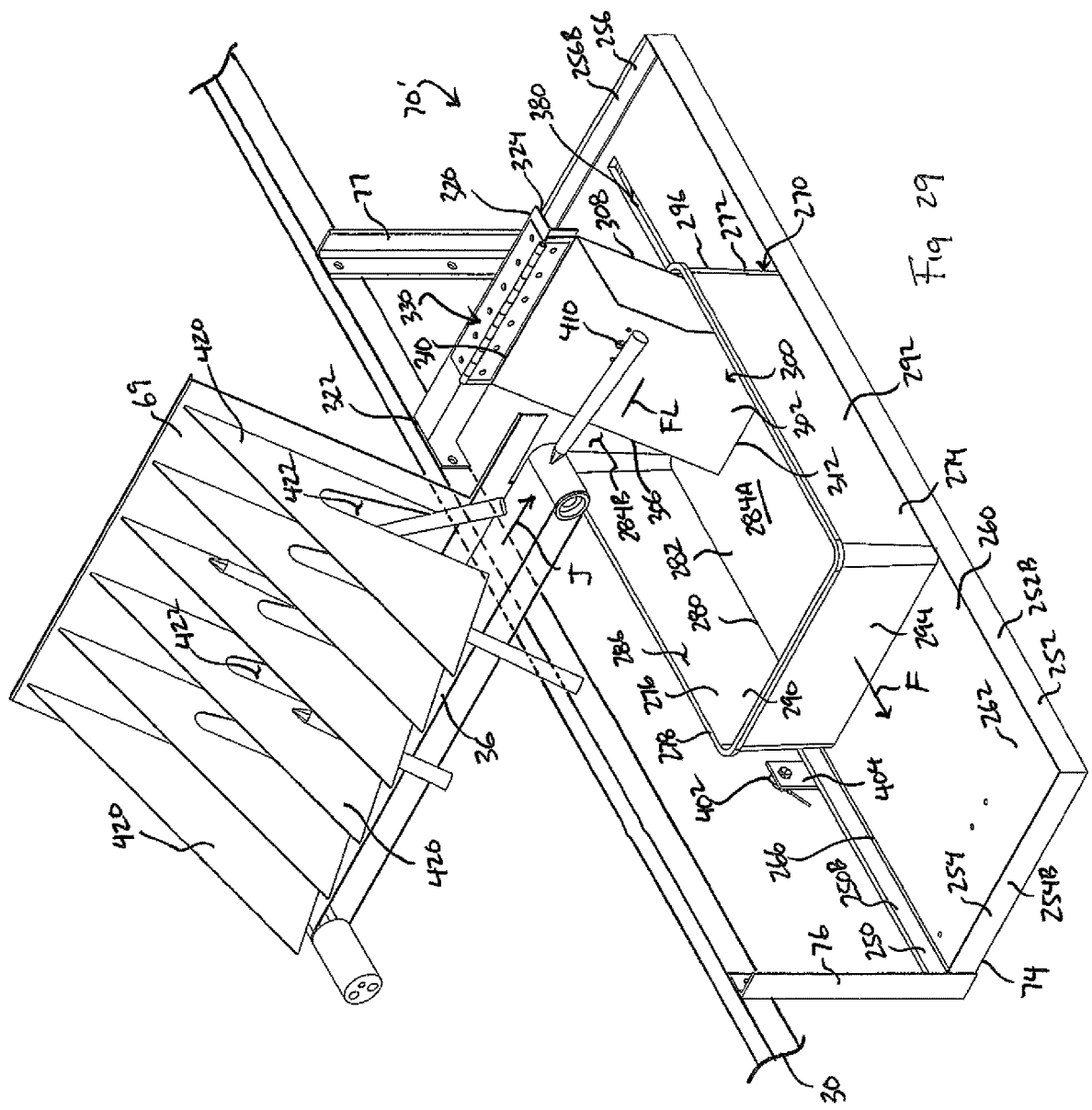

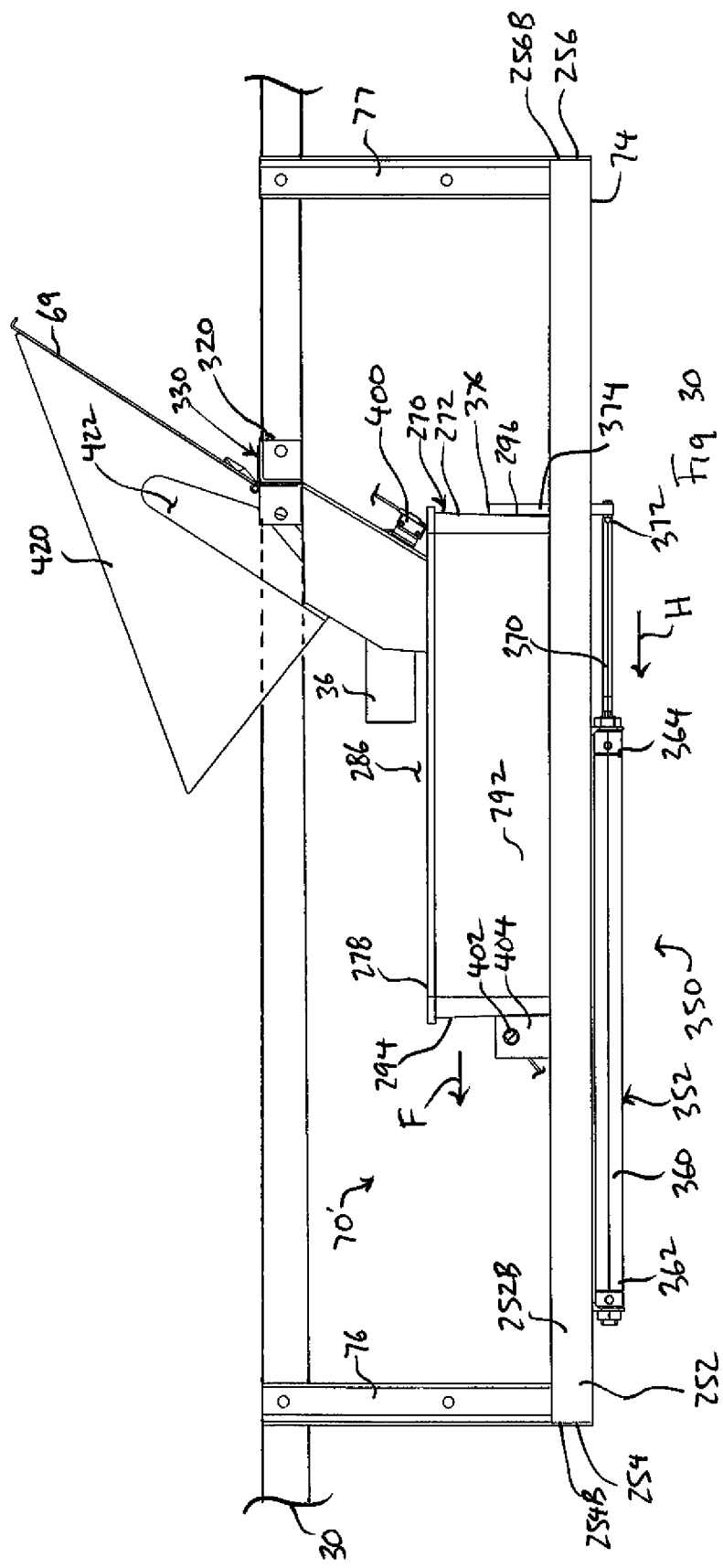

though this can be just one intermediate pick-up bed between the upstream pick-up bed and the downstream pick-up bed in certain examples.

ASPARAGUS LIFTING APPARATUS WITH INTERFERING MEMBERS, ASPARAGUS COLLECTION AND STORAGE APPARATUS, AND ASPARAGUS HARVESTERS FORMED THEREWITH

FIELD OF THE INVENTION

This invention relates to asparagus harvesting and, more particularly, to asparagus lifting apparatus and asparagus collection and storage apparatus specially adapted for use with an asparagus harvester.

BACKGROUND OF THE INVENTION

Asparagus is customarily cultivated in friable or loamy soil and is planted in beds to emerge as spears disposed in longitudinal rows or paths. The bed of growing asparagus spears surface from below the ground and extend to varying heights. It is known to harvest the spears of more than a predetermined height while leaving the remaining comparatively shorter spears to continue growing in the ground for later harvesting. Asparagus is harvested by hand or with an asparagus harvester.

A known asparagus harvester includes a chassis or frame configured to be advanced over the ground, whether by being self-propelled or towed behind a tractor, along the rows of the bed of growing asparagus. The chassis supports a pick-up apparatus for engaging and lifting the asparagus spears, a severing apparatus, composed of a series of severing assemblies, for severing the asparagus spears proximate to the ground, and a conveyor for receiving asparagus spears severed by the severing apparatus from the pick-up apparatus and conveying them to a lug box or other suitable storage area.

Each severing assembly relates to an appropriate alley defined by the asparagus harvester, is operatively connected to an actuator and to a sensor/detector, and includes a severing blade carried by a plunger mounted in a pneumatic cylinder and conduits that couple the pneumatic cylinder to a source of air under pressure through a dedicated valve unit. The valve unit is configured to switch between a firing position to supply air under pressure from the source through one of the conduits to cause the plunger to eject outwardly from the pneumatic cylinder to move the severing blade downwardly along a stroke path from a normally raised set position to a lowered severing position proximate to the ground for severing one of the asparagus spears in the path and a normal holding position to supply air under pressure from the source through another one of the conduit to cause the plunger to withdraw into the pneumatic cylinder to move the severing blade upwardly along the stroke path from its lowered severing position to its normally raised set position. As the frame advances along the rows of growing asparagus in the field, the asparagus spears of at least a pre-selected height of a corresponding row sequentially enter the alley and trigger the sensor energizing the actuator. The valve unit is controlled by the actuator under the influence of the sensor. When an impulse from the sensor is effective upon the actuator in response to the sensor detecting an asparagus spear at the alley while the chassis advances over the ground, the valve unit automatically switches to the firing position to cause the plunger in the cylinder to eject and to cause the connected severing blade to move downwardly along the stroke path from its normally raised set position to its lowered severing position proximate to the ground for severing the sensed/detected asparagus spear. The valve unit is configured to automatically switch from the firing position to the holding position when the blade completes its severing excursion, which immediately restores the blade to its normally raised set position. In the meantime, the spear has been engaged by the pick-up apparatus, which exerts an upward force on the spear but not to an extent to uproot or break the spear but only to hold and support the spear while the severing assembly does its work to sever the spear. The now severed spear is then lifted upwardly and carried somewhat rearwardly by the pick-up apparatus and is cast upon the conveyor, which conveys it to a suitable storage area supported by the chassis. This process is repeated for each asparagus spear that triggers the sensor.

The pick-up apparatus includes pick-up beds arranged one above the other from a lowermost or upstream one of the pick-up beds proximate to the ground to an uppermost or downstream one of the pick-up beds proximate to the conveyor. The pick-up apparatus normally includes two or more intermediate pick-up beds between the upstream pick-up bed and the downstream pick-up bed, although there can be just one intermediate pick-up bed between the upstream pick-up bed and the downstream pick-up bed in certain examples.

Each pick-up bed is characterized by pairs of adjacent pick-up rollers. The pick-up rollers of each pair of adjacent pick-up rollers counter-rotate with their closest portions having an inherent upward component. A pair of adjacent pick-up rollers of each of the pick-up beds relate to one of the alleys and to a corresponding one of the severing assemblies. For each alley and its corresponding severing assembly and pairs of adjacent pick-up rollers between the severing assembly and the conveyor from the upstream pick-up bed to the downstream pick-up bed, either side of an asparagus spear that enters the alley and that is of a sufficient height to trigger the corresponding sensor is engaged by the pair of adjacent pick-up rollers of the upstream pick-up bed and upon being severed is lifted upwardly thereby and handed off to and lifted in turn by each successive pair of adjacent pick-up rollers and ultimately cast onto the conveyor from the pair of adjacent pick-up rollers of the downstream pick-up bed and which transports it to the storage area.

Asparagus is often harvested when the ambient temperature is sufficiently low to cause the temperature of the valve units to drop below their suitable operating temperature which impairs or otherwise disables the valve units from sufficiently switching between the firing position and the holding position and thereby inherently impairs or otherwise disables the pneumatic cylinders from sufficiently actuating the plungers along the stroke path between the normally raised set positions of the severing blades to the lowered positions of the severing blades. This leaves uncut asparagus spears and thus unfavorably influences asparagus harvesting. Furthermore, asparagus spears severed by the severing apparatus routinely eject outwardly from between adjacent pick-up beds from either side of the pick-up apparatus only to fall to the ground during harvesting operations, which also unfavorably influences asparagus harvesting. It has also been found that severed spears inadvertently fall out the back of the pick-up beds downstream of the upstream pick-up bed and onto the ground only to become lost, which also unfavorably influences asparagus harvesting. It has additionally been found that that the collection and storage of the asparagus spears in the storage area from the conveyor is clumsy and often results in a disordered jumble of entangled spears that occupy an unnecessarily large amount of space compared to when stacked in an orderly, parallel arrangement. This requires the operator of the asparagus harvester to repeatedly cease harvesting operations, manually order the asparagus spears into an ordered, stacked arrangement in the storage area, and then resume harvesting operations. In view of at least these and other deficiencies inherent in the art, the need for continued improvement in the art is evident.

SUMMARY OF THE INVENTION

A.

According to the principle of the invention, improvements to an asparagus harvester for harvesting asparagus spears growing in the ground and projecting upwardly therefrom in a path are disclosed. The asparagus harvester includes a chassis configured to be advanced over the ground along the path and supporting a pick-up apparatus for engaging and lifting the asparagus spears, a severing assembly for severing the asparagus spears proximate to the ground and a conveyor for receiving from the pick-up apparatus and conveying away asparagus spears severed by the severing assembly, the severing assembly including a severing blade carried by a plunger mounted in a pneumatic cylinder, and conduits coupled to the pneumatic cylinder and through a valve unit to a source of air under pressure, the valve unit configured to switch between a firing position to supply air under pressure from the source through the one of the conduits to cause the plunger to eject outwardly from the pneumatic cylinder to move the severing blade downwardly along a stroke path from a raised set position to a lowered severing position proximate to the ground for severing one of the asparagus spears in the path and a holding position to supply air under pressure from the source through another one of the conduits to cause the plunger to withdraw into the pneumatic cylinder to move the severing blade upwardly along the stroke path from the lowered severing position to the raised set position.

1.

The improvements in one embodiment include a heater mounted proximate to the valve unit and configured to sufficiently heat the valve unit to enable the valve unit to switch between the firing position and the holding position in the presence of an ambient temperature sufficiently low to impair the valve unit from sufficiently switching between the firing position and the holding position. The heater is configured to activate in response to actuation of a switch operatively coupled to the heater. The heater is connected to the valve unit. The heater is connected to the valve unit with a thermally-conductive adhesive in an illustrative embodiment. The heater is a positive temperature coefficient heater in a preferred embodiment.

In another embodiment, the improvements include a method including mounting a heater proximate to the valve unit, and activating the heater, the heater sufficiently heating the heater over a period of time to enable the valve unit to switch between the firing position and the holding position in the presence of an ambient temperature sufficiently low to impair the valve unit from sufficiently switching between the firing position and the holding position. The heater is configured to activate in response to actuation of a switch operatively coupled to the heater, and the step of activating the heater includes actuating the switch. The step of mounting the heater proximate to the valve unit further includes connecting the heater to the valve unit, such as by adhering the heater to the valve unit with a thermally-conductive adhesive in an illustrative embodiment. In this embodiment, the heater is preferably a positive temperature coefficient heater.

B.

According to the principle of the invention, improvements to an asparagus harvester for harvesting asparagus spears growing in the ground and projecting upwardly therefrom in a path are disclosed. The asparagus harvester includes a chassis configured to be advanced over the ground along the path and supporting a pick-up apparatus for engaging and lifting the asparagus spears, a severing apparatus for severing the asparagus spears proximate to the ground and a conveyor for receiving from the pick-up apparatus and conveying away asparagus spears severed by the severing assembly.

1.

In one embodiment, the improvements include a spear guide disposed on either side of the pick-up apparatus for guiding the asparagus spears severed by the severing apparatus through the pick-up apparatus and currently disabling the asparagus spears severed by the severing apparatus from ejecting laterally outward from either side of the pick-up apparatus. The pick-up apparatus includes pick-up beds arranged one above the other and the spear guides are disposed between adjacent pick-up beds and define a laterally-enclosed spear-conveying area between the adjacent pick-up beds. Each of the adjacent pick-up beds has a leading end, a trailing end and a length extending longitudinally to the path from the leading end to the trailing end and the spear guides extend forwardly along the lengths from proximate to the trailing ends and to and beyond the leading ends. The spear guides project angularly outward from either side of one of the adjacent pick-up beds. In another embodiment, the spear guides are supported by support members mounted proximate to either side of one of the adjacent pick-up beds. One of the adjacent pick-up beds is a lowermost one of the pick-up beds proximate to the ground. The spear guides are shields, which are each flat in an illustrative embodiment.

2.

In another embodiment, the improvements include a method including disposing a spear guide on either side of the pick-up apparatus for guiding the asparagus spears severed by the severing apparatus through the pick-up apparatus and currently disabling the asparagus spears severed by the severing apparatus from ejecting laterally outward from either side of the pick-up apparatus. The pick-up apparatus includes pick-up beds arranged one above the other, and the step of disposing the spear guide on either side of the pick-up apparatus includes disposing the spear guide on either side of the pick-up apparatus between adjacent pick-up beds to form a laterally-enclosed spear-conveying area between the adjacent pick-up beds. Each of the adjacent pick-up beds has a leading end, a trailing end and a length extending longitudinally to the path from the leading end to the trailing end and the spear guides extend forwardly along the lengths from proximate to the trailing ends and to and beyond the leading ends. The spear guides project angularly outward from either side of one of the adjacent pick-up beds in an illustrative embodiment. The step of disposing the spear guide on either side of the pick-up apparatus between adjacent pick-up beds includes mounting the spear guide to a support member mounted proximate to either side of one of the adjacent pick-up beds. One of the adjacent pick-up beds is a lowermost one of the pick-up beds proximate to the ground. The spear guides are shields, which are each flat in an illustrative embodiment.

C.

According to the principle of the invention, improvements to an asparagus harvester for harvesting asparagus spears growing in the ground and projecting upwardly therefrom in a path are disclosed. The asparagus harvester includes a chassis configured to be advanced over the ground along the path and supporting a pick-up apparatus for engaging and lifting the asparagus spears, a severing apparatus for severing the asparagus spears proximate to the ground and a conveyor for receiving from the pick-up apparatus and conveying away asparagus spears severed by the severing assembly, the pick-up apparatus includes pick-up beds each including a leading end, a trailing end, a first side and a second side, and the pick-up beds are arranged one above the other and include an upper pick-up bed over a lowermost pick-up bed. The improvements include an interfering member extending across the trailing end of the upper pick-up bed from the first side to the second side and configured to disable spears severed by the severing apparatus and being lifted through the upper pick-up bed between the leading end and the trailing end from passing outwardly through the trailing end of the upper pick-up bed. The interfering member, which is an elongate bar, is carried by a support member mounted on either side of the upper pick-up bed.

D.

According to the principle of the invention, improvements to an asparagus harvester for harvesting asparagus spears growing in the ground and projecting upwardly therefrom in a path are disclosed. The asparagus harvester includes a chassis configured to be advanced over the ground along the path and supporting a pick-up apparatus for engaging and lifting the asparagus spears, a severing apparatus for severing the asparagus spears proximate to the ground and a conveyor for receiving from the pick-up apparatus and conveying away severed asparagus spears severed by the severing apparatus, the pick-up apparatus includes pick-up beds arranged one above the other and including an upper pick-up bed over a lowermost pick-up bed, and the upper pick-up bed includes adjacent pick-up rollers configured to be actuated for counter-rotation and each including a leading end and a trailing end.

In one embodiment, the improvements include an interfering member mounted to each pick-up roller proximate to the trailing end thereof. The interfering members are sufficiently juxtaposed to disable the severed asparagus spears, when being engaged and lifted by and between the pick-up rollers between the leading end and the trailing end of each pick-up roller when the pick-up rollers are actuated for counter-rotation, from passing outwardly from between the trailing ends. The interfering members are configured to counter-rotate with the pick-up rollers when the pick-up rollers are actuated for counter-rotation while remaining sufficiently juxtaposed. The interfering members are identical. Each interfering member is a flat ring in an exemplary embodiment.

2.

In another embodiment, the improvements include a method including mounting an interfering member to each pick-up roller proximate to the trailing end thereof, the interfering members arranged in juxtaposition, counter-rotating the pick-up rollers, the counter-rotating pick-up rollers engaging and lifting the severed asparagus spears therebetween between the leading end and the trailing end of each pick-up roller, and disabling, by the juxtaposition of the interfering members, the severed asparagus spears from passing outwardly from between the trailing ends. The method further includes the interfering members counter-rotating with the counter-rotating pick-up rollers while remaining in the juxtaposition. The interfering members are identical. Each interfering member is a flat ring in an exemplary embodiment.

E.

According to the principle of the invention, an asparagus pick-up bed for an asparagus harvester includes adjacent pick-up rollers configured to be actuated for counter-rotation and each including a leading end and a trailing end, and an interfering member mounted to each pick-up roller proximate to the trailing end thereof, the interfering members sufficiently juxtaposed to disable severed asparagus spears, when being engaged and lifted by and between the pick-up rollers between the leading end and the trailing end of each pick-up roller when the pick-up rollers are actuated for counter-rotation, from passing outwardly from between the trailing ends. The interfering members are configured to counter-rotate with the pick-up rollers when the pick-up rollers are actuated for counter-rotation while remaining sufficiently juxtaposed. The interfering members are identical. Each interfering member is a flat ring in an exemplary embodiment.

F.

According to the principle of the invention, improvements to an asparagus harvester for harvesting asparagus spears growing in the ground and projecting upwardly therefrom in a path are disclosed. The asparagus harvester includes a chassis configured to be advanced over the ground along the path and supporting a pick-up apparatus for engaging and lifting the asparagus spears, a severing apparatus for severing the asparagus spears proximate to the ground, and a conveyor for receiving from the pick-up apparatus and conveying away severed asparagus spears severed by the severing apparatus.

1.

In one embodiment, the improvements include a bin mounted displaceably adjacent to the conveyor, a partition in the bin, the partition and the bin defining a confined volume open to receive the severed asparagus spears from the conveyor, a drive assembly configured to displace the bin relative to the partition from a first station to a second station when the drive assembly actuates, the confined volume having a first size when the bin is at the first station and a second size when the bin is at the second station, the second size greater than the first size, and a sensor operatively coupled to the drive assembly, wherein the drive assembly actuates when the sensor senses a presence of severed asparagus spears at a fill level of the confined volume. The partition includes an upper end and extends downwardly into the bin from the upper end mounted at a fixed position over the bin. The sensor is mounted to the partition. A hole extends through the partition from a first surface thereof facing the confined volume to a second surface thereof facing away from the confined volume, the sensor opposes the second surface adjacent to the hole, and the sensor is open to the confined volume via the hole, enabling the sensor to sense the presence of severed asparagus spears at the fill level of the confined volume. The sensor is mounted to the second surface of the partition. The drive assembly is a cylinder assembly. The cylinder assembly includes a cylinder mounted at a fixed position, and an operating rod coupled to the bin and mounted partially within the cylinder for movement between an extended position corresponding to one of the first station of the bin and the second station of the bin and a retracted position corresponding to another one of the first station of the bin and the second station of the bin. The confined volume is flanked by a first side of the bin proximally to the conveyor a second side of the bin distally from the first side of the bin and the conveyor. A backstop is adjacent to the second side of the bin opposite to the conveyor, the backstop configured to deflect the severed asparagus spears into the confined volume from the conveyor. The backstop extends from the partition.

2.

In another embodiment, the improvements include a bin mounted displaceably adjacent to the conveyor, a partition in the bin, the partition and the bin defining a confined volume open to receive the severed asparagus spears from the conveyor, a drive assembly configured to displace the bin relative to the partition to enlarge the confined volume each time the drive assembly actuates, and a sensor operatively coupled to the drive assembly, wherein the drive assembly actuates each time the sensor senses a presence of severed asparagus spears at a fill level of the confined volume. The partition includes an upper end and extends downwardly into the bin from the upper end mounted at a fixed position over the bin. The sensor is mounted to the partition. A hole extends through the partition from a first surface thereof facing the confined volume to a second surface thereof facing away from the confined volume, the sensor opposes the second surface adjacent to the hole, and the sensor is open to the confined volume via the hole, enabling the sensor to sense the presence of asparagus spears at the fill level of the confined volume. The sensor is mounted to the second surface of the partition. The drive assembly is a cylinder assembly. The cylinder assembly includes a cylinder mounted at a fixed position, and an operating rod coupled to the bin and mounted partially within the cylinder for movement between an extended position and a retracted position to displace the bin. The confined volume is flanked by a first side of the bin proximally to the conveyor a second side of the bin distally from the first side of the bin and the conveyor. A backstop is adjacent to the second side of the bin opposite to the conveyor, the backstop configured to deflect the severed asparagus spears into the confined volume from the conveyor. The backstop extends from the partition.

In yet another embodiment, the improvements include a method including mounting a bin displaceably adjacent to the conveyor, locating a partition in the bin, the partition and the bin defining a confined volume open to receive the severed asparagus spears from the conveyor, configuring a drive assembly to displace the bin relative to the partition between a first station and a second station when the drive assembly actuates, the confined volume having a first size when the bin is at the first station and a second size when the bin is at the second station, the second size greater than the first size, operatively coupling the drive assembly to a sensor configured to sense a presence of severed asparagus spears at a fill level of the confined volume, the drive assembly configured to actuate when the sensor senses the presence of severed asparagus spears at the fill level, the sensor sensing the presence of severed asparagus spears at the fill level, and in response the drive assembly actuating displacing the bin from the first station to the second station. Locating the partition in the bin includes mounting an upper end of the partition at a fixed position over the bin and extending the partition downwardly into the bin from the upper end. Additional steps include forming a hole through the partition from a first surface thereof facing the confined volume to a second surface thereof facing away from the confined volume, locating the sensor adjacent to the second surface proximate to the hole, and the hole opening the sensor to the confined volume, enabling the sensor to sense the presence of severed asparagus spears at the fill level of the confined volume. Locating the sensor adjacent to the second surface proximate to the hole includes mounting the sensor to the second surface proximate to the hole. Configuring the drive assembly includes providing a cylinder assembly including a cylinder and an operating rod mounted partially within the cylinder for movement between an extended position and a retracted position, mounting the cylinder at a fixed position, and coupling the operating rod to the bin, the extended position of the operating rod corresponding to one of the first station of the bin and the second station of the bin and the retracted position of the operating rod corresponding to another one of the first station of the bin and the second station of the bin. The method further includes configuring a backstop at a fixed position adjacent to the confined volume and opposing the conveyor, the backstop deflecting the severed asparagus spears into the confined volume from the conveyor. Configuring the backstop at the fixed position adjacent to the confined volume and opposing the conveyor preferably includes extending the backstop from the partition.

BRIEF DESCRIPTION OF THE DRAWINGS

Specific objects and advantages of the invention will become apparent to those skilled in the art from the following detailed description of illustrative embodiments thereof, taken in conjunction with the drawings in which:

FIGS. 27-31 illustrate a sequence of operation of the embodiment first illustrated in FIG. 19.

DETAILED DESCRIPTION

Figure 1:
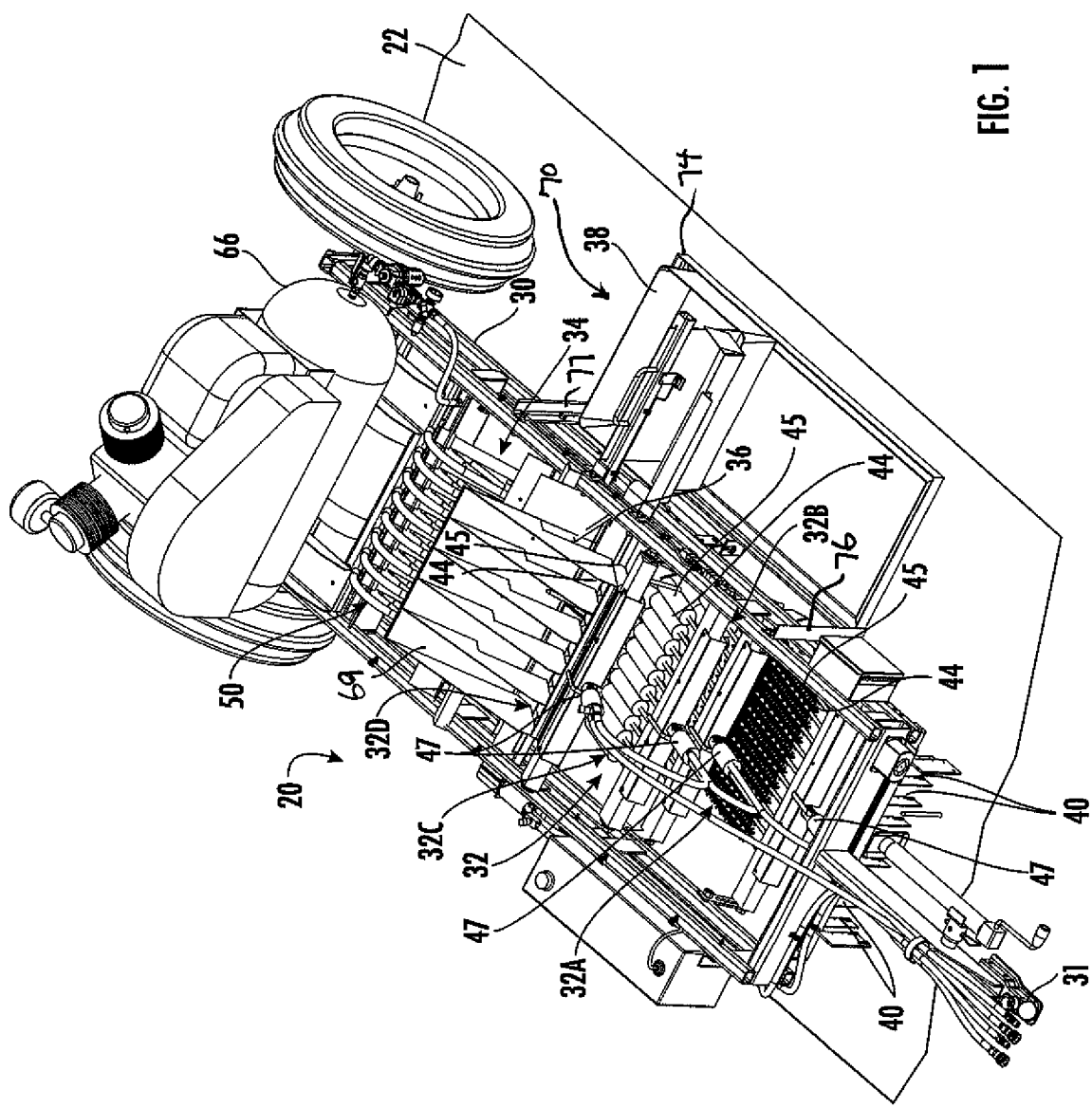
FIG. 1 is a top perspective view of an asparagus harvester embodying features of the invention.
Figure 2:
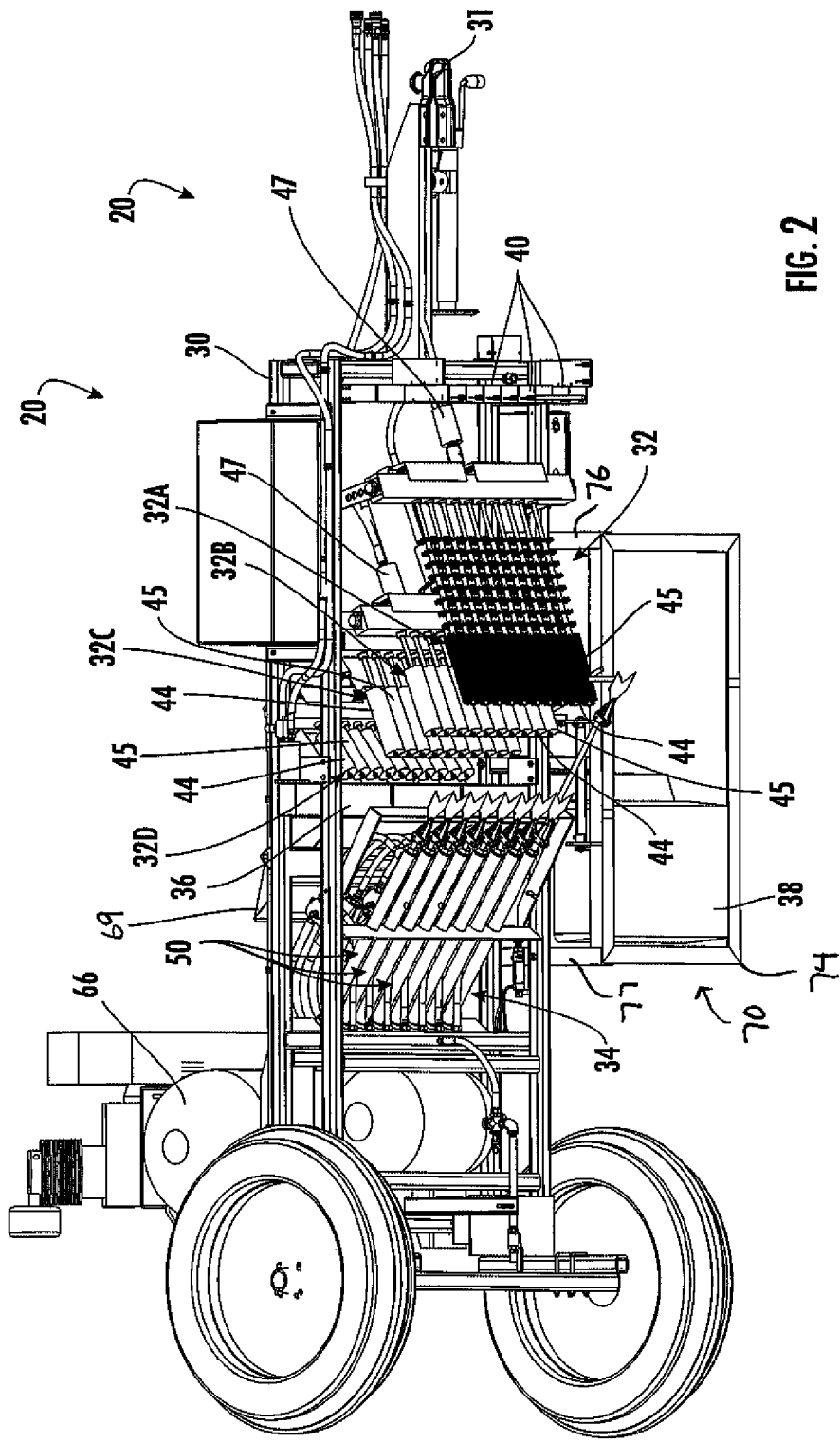
FIG. 2 is a bottom perspective view of the embodiment of FIG. 1.
Figure 3:
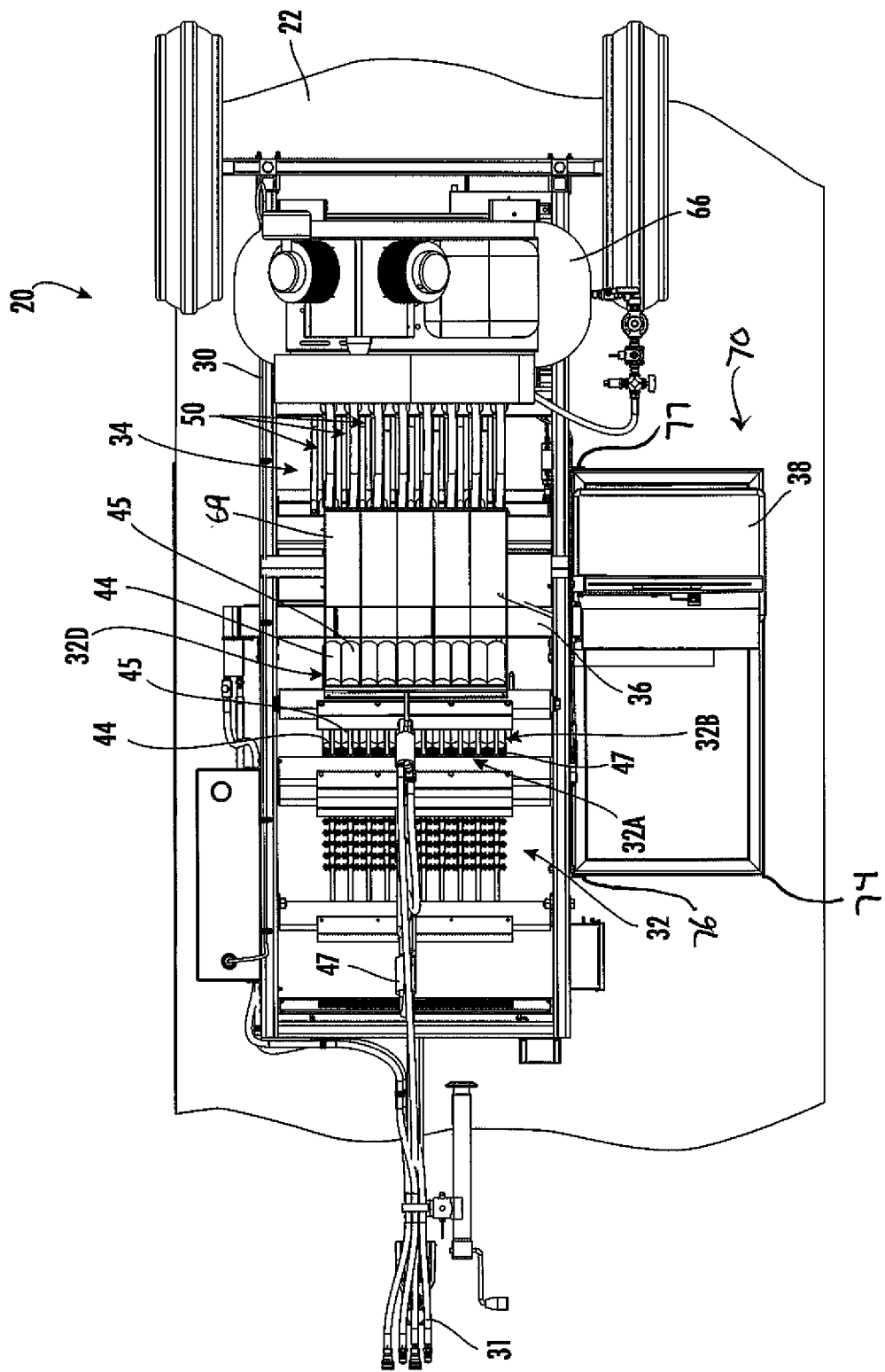
FIG. 3 is a top plan view of the embodiment of FIG. 1.
Figure 4:
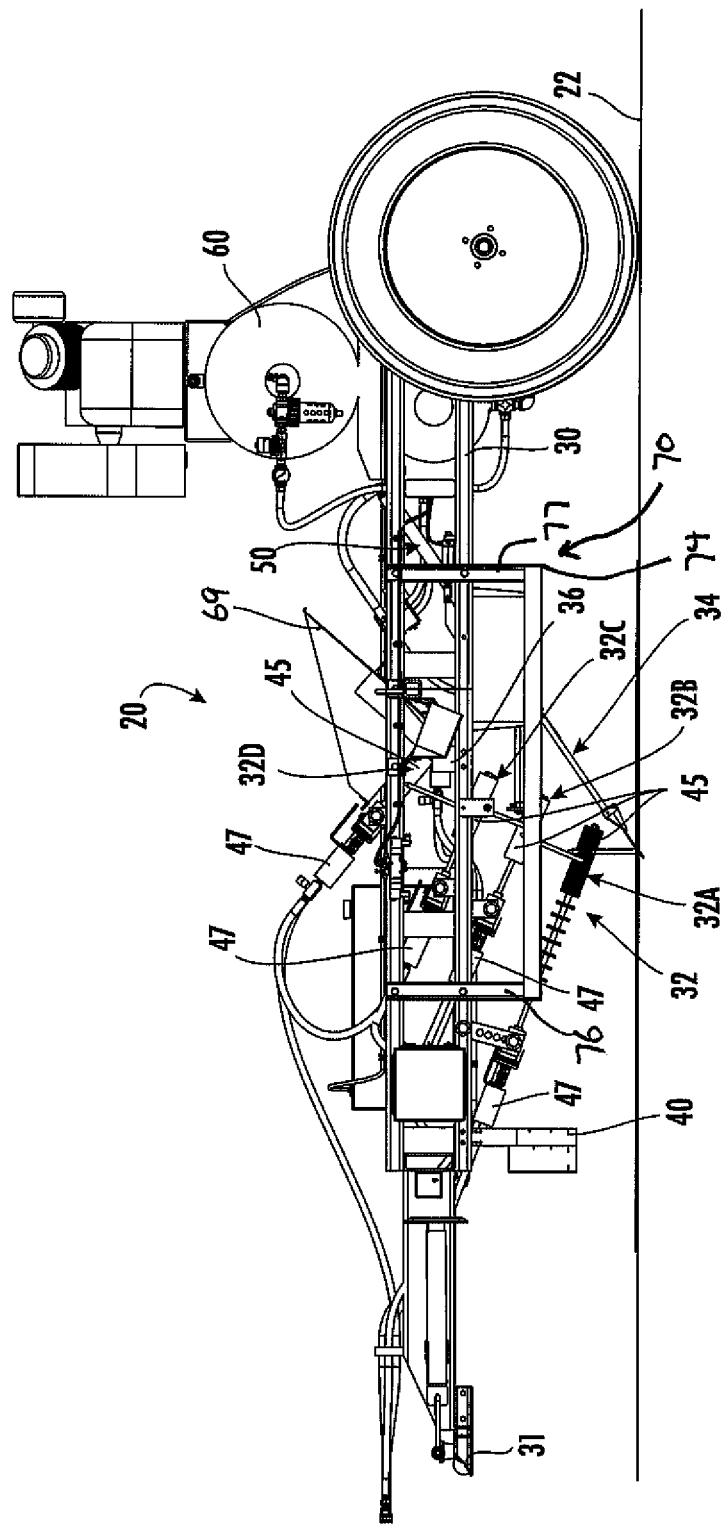
FIG. 4 is a side elevation view of the embodiment of FIG. 1.
Figure 5:
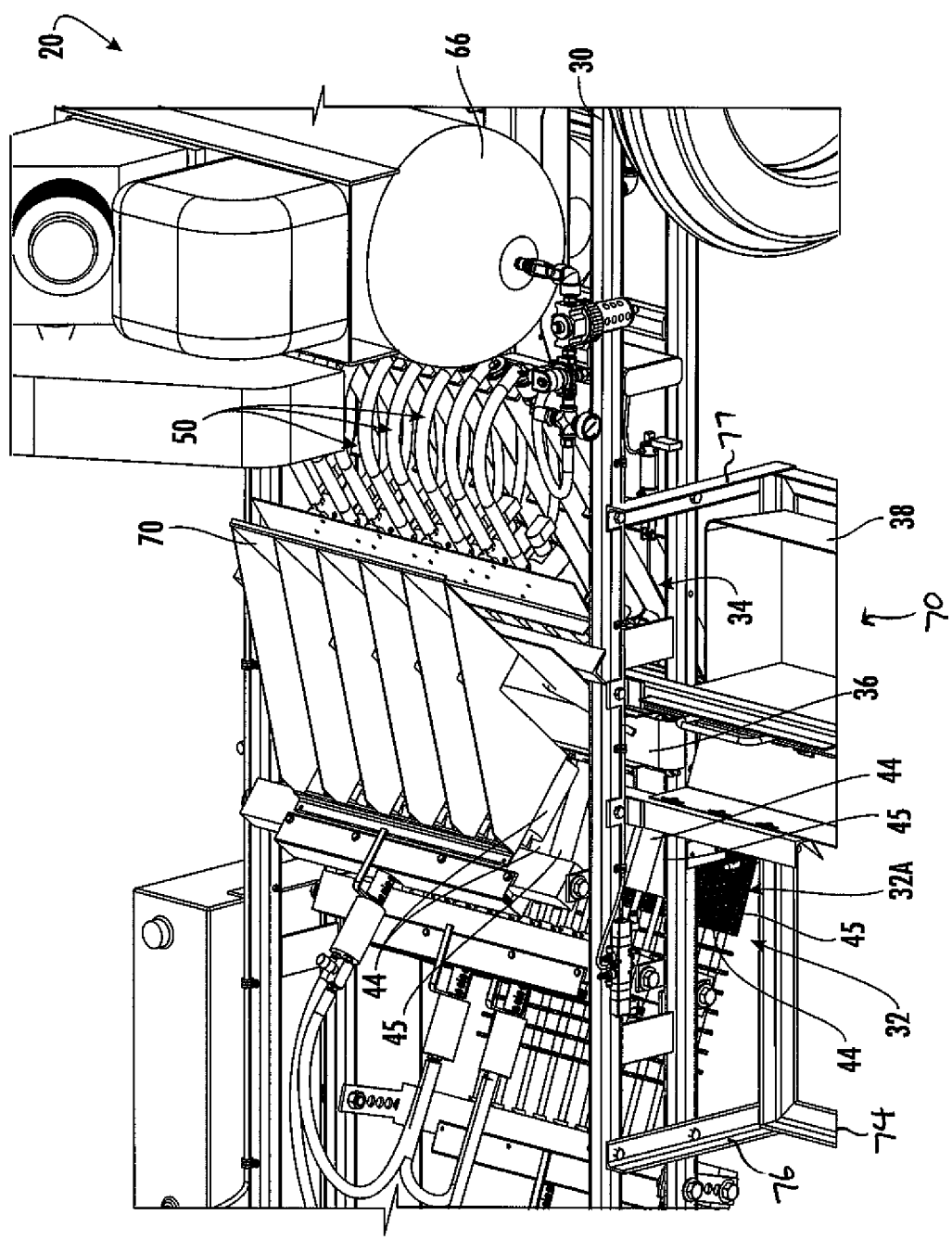
FIG. 5 is an enlarged perspective view of the asparagus harvester corresponding to FIG. 1.

Turning to the drawings, in which like reference characters indicate corresponding elements throughout the various views, FIG. 1 illustrates an asparagus harvester 20 embodying features of the invention. Harvester 20 is configured to harvest asparagus spears growing in ground/field 22 and projecting upwardly therefrom in longitudinal rows or paths. Asparagus harvester 20 is a wheeled machine, which enables it when advanced to roll across ground 22. In this embodiment, harvester 20 is an implement configured to be towed behind a tractor, and it can be configured to be self-propelled in alternate embodiments. In a self-propelled embodiment, for example, an asparagus harvester constructed and arranged in accordance with the principle of the invention can be configured with a propelling unit, one or more fuel tanks, and the other customary attributes of a self-propelled harvester ordinarily controlled by an operator operating suitable controls from a seat, cab or other suitable operator area.

Referring to FIGS. 1-4, harvester 20 includes wheeled frame or chassis 30 incorporating hitch 31 designed to be suitably hitched to a tractor and which is configured to be advanced by being towed over ground 22 along the paths of growing asparagus. Chassis 30, a rugged, stout, reinforced frame of metal bar and tube stock secured by welding, rivets, fasteners, or combination thereof, supports pick-up apparatus 32 for engaging and lifting the asparagus spears, severing apparatus 34 for severing the asparagus spears proximate to ground 22 and conveyor 36. Conveyor 36 is mounted at a fixed position and is configured to receive from pick-up apparatus 32 and convey away asparagus spears severed by severing apparatus 34 to a suitable asparagus collection and storage apparatus 70 disposed along one side of harvester 20. The apparatus 60 includes a bin or lug box 38 supported by an auxiliary framework 72 of chassis 30. Framework 72 includes a frame 74 extending outwardly from opposed, upright supports 76 and 77 affixed to chassis 30. Frame 72 supports lug box 38, which is open to receive severed asparagus spears from conveyor 36.

As harvester 20 advances along the rows of growing asparagus spears, some of the asparagus spears are tall enough to project upwardly and to enter generally into alleys or spaces between individual pairs of a transverse series of upright plates 40 in FIG. 1 supported by chassis 30 immediately behind hitch 31. Plates 40 are planar and are disposed longitudinally or parallel to the direction of advance of harvester 20 and are disposed at an appropriate distance above the ground. Plates 40 arranged on chassis 30 immediately to the rear of hitch 31 support standard sensors/detectors connected by appropriate circuitry to a source of power on chassis 30 and through a representative sensor and to an appropriate one of a corresponding number of individual actuators. As harvester 20 advances, the sensors are arranged to not sense/detect the relatively short asparagus spears. Rather, the sensors are arranged to sense/detect the sufficiently tall spears suitable for harvesting, which causes the corresponding sensors to be alerted and the corresponding actuators to be energized in response as is known in the art.

The sensing of an asparagus spear is not necessarily immediate in effect since the sensor and actuator circuit may include a time delay structure. Particularly, this may be a delay dependent upon the amount of rotation of the vehicle wheels (corresponding to an amount of vehicular advance) so that from the time a sensor senses an asparagus spear until the corresponding actuator becomes effective upon that particular spear can be a time lapse of a predetermined or selected amount related to the amount or speed of advance of harvester 20.

Arranged on chassis 30 immediately to the rear of plates is the pick-up apparatus denoted generally at 32. Pick-up apparatus 32 is made up of pick-up beds 32A, 32B, 32C, and 32D arranged one above the other from the lowermost pick-up bed 32A proximate to the ground to the uppermost pick-up bed 32D proximate to conveyor 36 as shown. Pick-up beds 32A, 32B, 32C, and 32D are each part of a pick-up unit of harvester 20. In this embodiment, there are four pick-up beds 32A, 32B, 32C, and 32D of four corresponding pick-up units. Pick-up bed 32B is immediately above pick-up bed 32A proximate to the ground, pick-up bed 32C is immediately above pick-up bed 32B, and pick-up bed 32D proximate to conveyor 36 is immediately above pick-up bed 32C. Pick-up beds 32B and 32C between the lowermost pick-up bed denoted at 32A and the uppermost pick-up bed denoted at 32B are intermediate pick-up beds. Although this harvester 20 embodiment includes two intermediate pick-up beds 32B and 32C, pick-up apparatus 32 can include less or more intermediate pick-up beds in alternate embodiments.

Pick-up beds 32A-32D are known in the art and similar in that they are each characterized by a transverse array of pick-up rollers 44 and 45. These are comparable in number to plates 40 and likewise are arranged in counter-rotating designated pairs. The spaces between the designated pairs of the pick-up rollers 44 and 45 are disposed in longitudinal alignment with or centrally of the spaces or alleys between the plates 40. The pick-up rollers 44 and are mounted for rotation about parallel axes lying in longitudinal planes and parallel to each other and arranged, in this example, at an inclination with the aft or trailing portion of the rollers closer to the ground compared to the forward or leading portion of the rollers at a comparatively greater distance from the ground.

Pick-up rollers 44 and 45 that constitute each of pick-up beds 32A, 32B, 32C, and 32D are customarily provided with relatively rigid cores and with surrounding coverings of yieldable, relatively soft material such as foam rubber or the like in the form of pads or fingers for example. The cores of pick-up rollers 44 and 45 are mounted on corresponding shafts each mounted in suitable journals and carry drive gears all in engagement with a common chain or belt appropriately connected to a drive shaft ultimately driven by a motor 47, which in this embodiment is a hydraulic motor operatively coupled to an appropriate hydraulic system as is known in the art. Pick-up rollers 44 and 45 are simultaneously rotated at substantially the same speed, and the adjacent pick-up rollers 44 and 45 of each pair counter-rotate and thereby move with their closest portions having an upward component as is known in the art.

Figure 6:
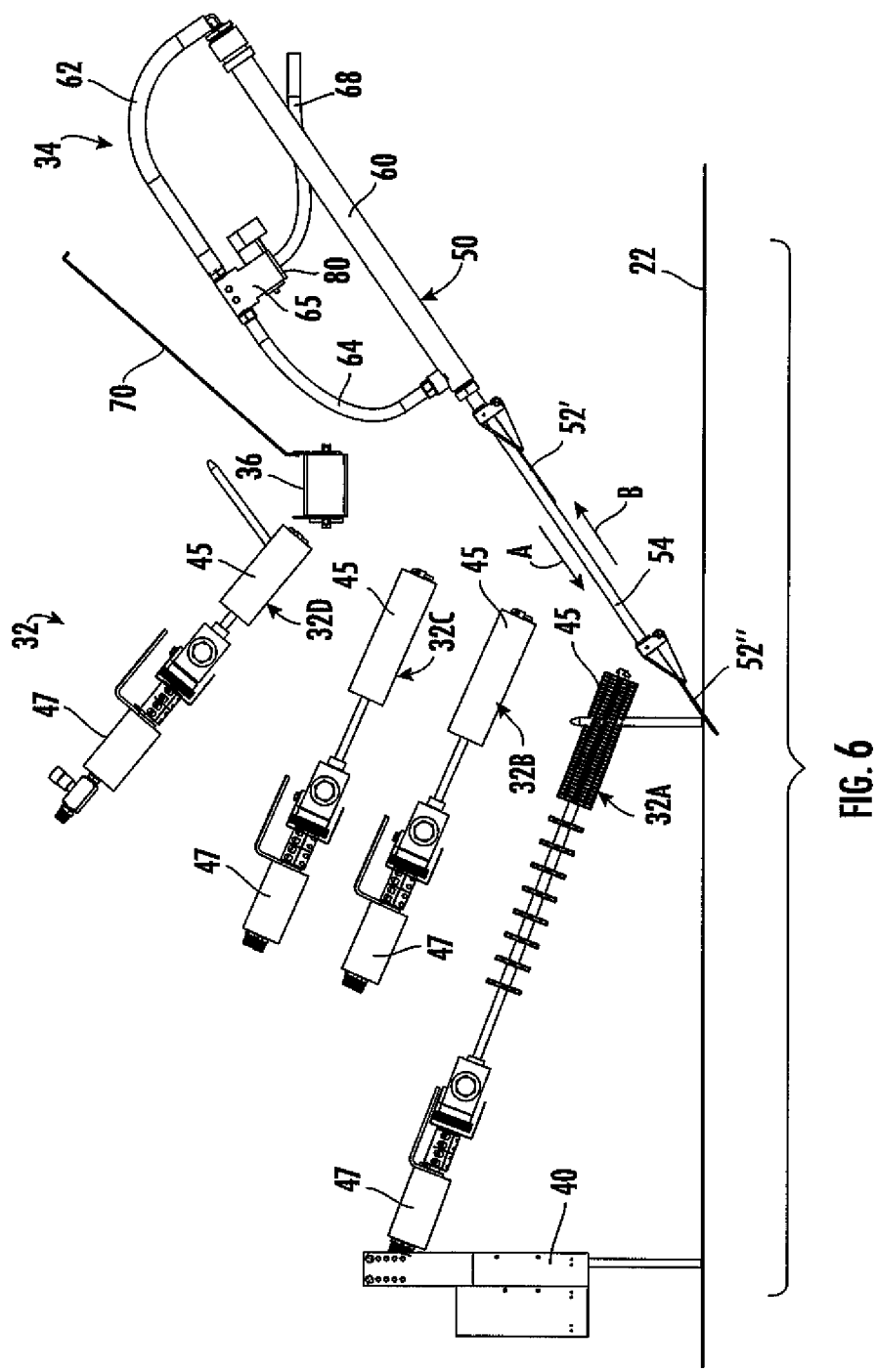
FIG. 6 is a side elevation view of a pick-up apparatus and an asparagus severing assembly removed from the asparagus harvester of FIG. 1 for illustrative purposes.

As harvester 20 advances, brought into action is severing apparatus 34 arranged on chassis 30 immediately to the rear of pick-up apparatus 32. Severing apparatus 34 includes identical severing assemblies 50 arranged in a transverse array with one severing assembly 50 for each of the spaces or alleys between the initial plate 40 pairs. Severing assemblies 50 are identical. Accordingly, severing assembly 50' in FIG. 6 will now be discussed, with the understanding that the ensuing discussion of severing assembly 50' applies in every respect to each severing assembly 50.

Like each severing assembly 50, severing assembly 50' relates to an appropriate alley defined by the appropriate pair of plates 40 of harvester 20 and to a corresponding sensor and actuator and includes a suitable severing blade 52 carried by plunger 54 mounted in pneumatic cylinder 60. Plunger 54 and pneumatic cylinder 60 form a standard and well-known pneumatic cylinder assembly. Conduits 62 and 63 couple pneumatic cylinder 60 through valve unit 65 to a source 66 (FIGS. 1-5) of air under pressure via supply conduit 68. Valve unit 65, which in this example is a model VSS 1/2 AAS 24 VDC 4-way solenoid valve that is readily available under the brand name ALLENAIR or other like/ commensurate valve unit, is operatively coupled by standard circuitry to a corresponding actuator in turn operatively by standard circuitry to the sensor corresponding to the assigned alley for severing assembly 50'. Source 66 is a standard air compressor configured in this example to cycle between 135 pounds per square inch (psi) and 175 psi. Valve unit 65 is standard and well-known and configured to switch between a firing position to supply air under pressure from source 66 through conduit 62 to cause plunger 54 to eject outwardly from pneumatic cylinder 60 to move severing blade 52 downwardly in the direction of arrow A along a stroke path from its normally raised set position denoted at 52' to its lowered severing position denoted at 52" proximate to ground 22 for severing one of the asparagus spears in the path and a normal holding position to supply air under pressure from source through conduit 64 to cause plunger 54 to withdraw into pneumatic cylinder 60 to move severing blade 52 upwardly in the direction of arrow B along the stroke path from its lowered severing position denoted at 52" to its normally raised set position denoted at 52'.

As harvester 20 advances along the rows of growing asparagus in the ground 22, the asparagus spears of a pre-selected height of a corresponding row sequentially enter the alley corresponding to severing assembly 50' and trigger the corresponding sensor energizing the corresponding actuator. Valve unit 65 connected by appropriate circuitry to the actuator is controlled by the actuator under the influence of the sensor. When an impulse from the sensor is effective upon the actuator in response to the sensor sensing/ detecting an asparagus spear at the alley while harvester 20 advances over the ground, valve unit 65 automatically switches from the normal holding position to the firing position to cause plunger 54 in pneumatic cylinder 60 to eject to cause the connected severing blade 52 to move downwardly in the direction of arrow A along the stroke path from its normally raised set position denoted at 52' in FIG. 6 to its lowered severing position denoted at 52" in FIG. 6 proximate to ground 22 for severing the sensed/detected asparagus spear. Valve unit 54 is configured to automatically switch from its firing position to its normal holding position when the severing blade 52 completes its severing excursion, which immediately restores the severing blade 52 to its normally raised set position denoted at 52' in FIG. 6 from its lowered severing denoted at 52" in FIG. 6.

In the meantime, the spear has been engaged by pick-up apparatus 32, which exerts an upward force on the spear but not to an extent to uproot or break the spear but only to hold and support the spear while severing assembly 50' does its work. The now severed spear is lifted upwardly and carried somewhat rearwardly by pick-up apparatus 32 and cast therefrom onto conveyor 36, which conveys away the spear to lug box 38. This standard and well-known process is repeated for each asparagus spear that triggers the sensor associated with severing assembly 50', further details of which will readily occur to the skilled artisan.

In the general operation of harvester 20, as chassis 30 advances along the rows of growing asparagus in the ground 22, asparagus spears become disposed in appropriate alleys between the appropriate plate 40 pairs. A pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is of a sufficient height to trigger the corresponding sensor is engaged by the pair of adjacent pick-up rollers 44 and 45 of the lowermost pick-up bed 32A, which exert an upward force on the asparagus spear sufficient to hold it without uprooting it, and upon being severed the severing assembly 50 is lifted upwardly thereby and handed off to and lifted in turn by the corresponding pair of adjacent pick-up rollers 44 and 45 of the succeeding pick-up beds 32B, 32C, and 32D, respectively, and ultimately cast onto conveyor 36 from the pair of adjacent pick-up rollers of the uppermost pick-up bed 32D and which transports it to the storage area, which in this example is lug box 38, thereby completing an asparagus spear harvesting operation. In this example, the asparagus spear is cast onto up-angled backstop 69 immediately to the rear of conveyor 36 and which slides down backstop 69 by gravity onto conveyor 36.

Harvester 20 is effective to be advanced, whether by being driven or towed, over ground/field 22 along rows of growing asparagus spears. Harvester 20 is effective to sever the spears at an appropriate position beneath the surface of the soil and to extract or withdraw such severed spears from their growing location and deposit them gently upon conveyor 36 for carriage to eventual storage.

Valve unit 65 is configured to operate at and above an operating temperature, namely, a temperature at and above which valve unit 65 is configured to operate for its intended purpose. In this example, the operating temperature of valve unit 65 is 90 degrees Fahrenheit (° F.). When valve unit 65 is at or above this operating temperature, 90° F. in this example, valve unit 65 is enabled to work for its intended purpose, namely, to completely or otherwise sufficiently switch repeatedly between its firing position and its holding position to enable pneumatic cylinder 60 to completely or otherwise sufficiently actuate plunger 54 repeatedly along the stroke path between the normally raised position of severing blade denoted at 52' and the lowered severing position of severing blade denoted at 52".

It is customary to harvest asparagus spears when the ambient temperature is below the operating temperature of valve unit 65. When the ambient temperature is below the operating temperature of valve unit 65 and inherently chills valve unit 65 to below its operating temperature, valve unit 65 is inherently disabled from reaching and operating at its operating temperature. In other words, when the ambient temperature is below the operating temperature of valve unit 65, the ambient temperature is inherently sufficiently low to disable valve unit 65 from reaching and operating at its operating temperature. Unfortunately, when valve unit 65 is below its operating temperature, the ability of its various moving parts to suitably move is inherently impaired or otherwise disabled which inherently restricts the amount of air that can move through valve unit 65. Accordingly, when valve unit 65 is below its operating temperature, valve unit 65 is inherently impaired or otherwise disabled from completely or otherwise sufficiently switching between its firing position and its holding position which, in turn, inherently disables pneumatic cylinder 60 from completely or otherwise sufficiently actuating plunger 54 along the stroke path of severing blade 52 between the normally raised set position of the severing blade denoted at 52' in FIG. 6 and the lowered severing position of the severing blade denoted at 52" in FIG. 6 and thereby disables severing blade 52 from reaching its lowered severing position to suitably sever growing asparagus spears. This leaves uncut asparagus spears suitable for harvesting and thus unfavorably influences asparagus harvesting.

To suitably solve this "temperature-sensitive" problem related to the effective operation of valve unit 65 associated with severing assembly 50', namely, to avoid unfavorable influences on asparagus harvester by enabling valve unit 65 to completely or otherwise sufficiently switch repeatedly between its firing position and its holding position for enabling pneumatic cylinder 60 to completely or otherwise sufficiently actuate plunger 54 repeatedly along the stroke path between the normally raised position of severing blade denoted at 52' and the lowered severing position of severing blade denoted at 52" in the presence of an ambient temperature that is sufficiently low to disable valve unit 65 from operating at or above its given operating temperature, heater 80 is mounted proximate to valve unit 65. Heater 80 is configured when activated to sufficiently heat valve unit 65 to enable valve unit 65 to operate according to its intended purpose, namely, to switch according to its intended operation between its firing position and its holding position in the presence of an ambient temperature sufficiently low to impair or otherwise disable valve unit 65 from so operating. Valve unit 65 is operatively associated with heater 80 configured to heat valve unit 65 in accordance with the principle of the invention.

In this example, heater 80 is mounted proximate to valve unit 65. Heater 80 is configured when activated to sufficiently heat valve unit 65 to at least its operating temperature over a period of time, such as from approximately 1-30 minutes for example depending how cold valve unit 65 is as dictated by the ambient temperature, before commencing asparagus-harvesting operations to enable valve unit 65 to suitably operate at or above is operating temperature to enable valve unit 65 to suitably switch between its firing position and its holding position to effectuate the desired operation of pneumatic cylinder 60 to actuate plunger 54 to move severing blade 52 along the stroke path between its normally raised set position denoted at 52' in FIG. 6 and its lowered severing position denoted at 52" in FIG. 6 for suitably severing sensed/detected asparagus spears in the presence of an ambient temperature sufficiently low to otherwise impair or disable valve unit 52 from reaching, and operating at, at least its operating temperature and from so operating according to its intended purpose, in accordance with the principle of the invention. Being configured with heater 80, valve unit 65 of severing assembly 50' is a heated valve unit, according to the principle of the invention.

Figure 7:
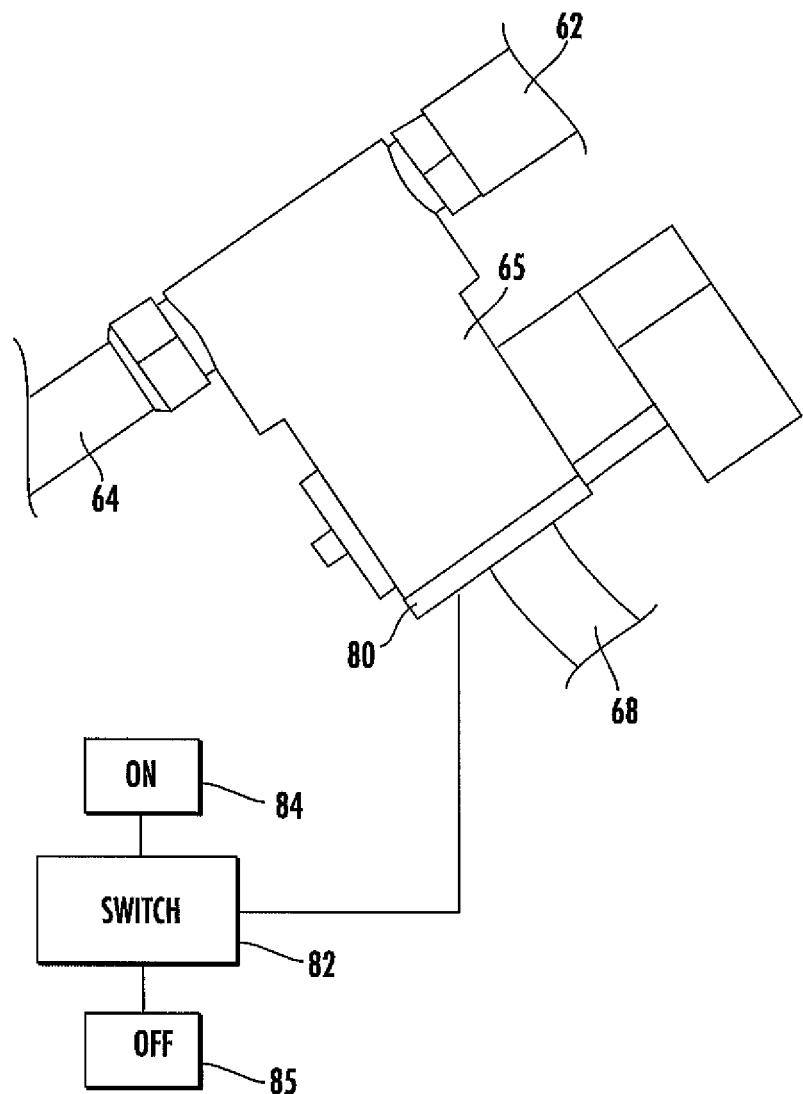
FIG. 7 is an enlarged fragmentary partially diagrammatic view corresponding to FIG. 6 illustrating a valve unit configured with a heater.

Referring to FIG. 7, heater 80 is connected by appropriate circuitry to a source of power on chassis 30 through a suitable switch 82. Heater 80 is configured to activate in response to actuation of switch 82 operatively coupled to heater 80. Switch 82 is configured to be selectively switched between an ON state denoted at 84 to activate heater 80 to sufficiently heat valve unit 65 over a given period of time to at least its operating temperature to enable valve unit 65 to suitably perform its intended functions in the presence of an ambient temperature sufficiently low to sufficiently disable valve unit 65 from operating at or above its operating temperature and thereby sufficiently performing its intended functions described with particularity herein and an OFF state denoted at 85 to deactivate switch 80 when the services of heater 80 are not required, such as when valve unit 65 is sufficiently heated to or above its operating temperature or is otherwise at or above its operating temperature to enable it to suitably perform its intended functions. In this example, switch 82 is a standard toggle switch which can be selectively operated by the operator of harvester 20 as needed.

In this example, heater 80 is a standard, rugged and readily-available positive temperature coefficient (PTC) heater, an efficient and well-known self-regulating heater that runs open-loop without any external diagnostic controls. Heater 80 is connected directly to valve unit 65 in this example by adhering heater 80 directly to valve unit 65 with a suitable thermally-conductive adhesive denoted at 87. Heat generated by heater 80 when activated in response to actuation of switch 82 transmits to valve unit 65 to suitably heat it when needed to at least its suitable operating temperature sufficient to enable valve unit 65 completely or otherwise sufficiently switch repeatedly between its firing position and its holding position for enabling pneumatic cylinder 60 to completely or otherwise sufficiently actuate plunger 54 repeatedly along the stroke path between the normally raised position of severing blade denoted at 52' and the lowered severing position of severing blade denoted at 52".

In the present embodiment disclosed herein by way of illustration and reference, the suitable operating temperature of valve unit 65 disclosed herein is 90 degrees Fahrenheit. The person having ordinary skill in the art will readily appreciate that the suitable operating temperature of the valve unit 65 may vary depending on the commensurate valve unit chosen for valve unit 65 in accordance with the principle of the invention and that heater 80 can be configured when activated to heat the chosen valve unit to its suitable operating temperature according to this disclosure.

The use of thermally-conductive adhesive 87 to connect heater 80 directly to valve unit 65 is easy and efficient, does not impair or interfere with the operation of heater 80 or the transfer of heat from heater 80 to valve unit 65, and does not require the use of mechanical fasteners, brackets or welding that could otherwise impair the operation of either valve unit 65 or heater 80. It is to be understood that each severing assembly 50 of severing apparatus 34 is identically configured with a suitable heater 80 as discussed in conjunction with severing assembly 50'. Each severing assembly 50 can be configured with a dedicated switch 82. In an alternate embodiment, the heaters 80 of the various severing assemblies 50 can be operatively coupled to a single switch 82 configured when actuated to concurrently activate the various heaters 80. If desired, each valve unit and its attached heater of each of the severing assemblies 50 can be configured with be insulated to retain heat, such as by the application of insulation or an insulative jacket for example.

Figure 8:
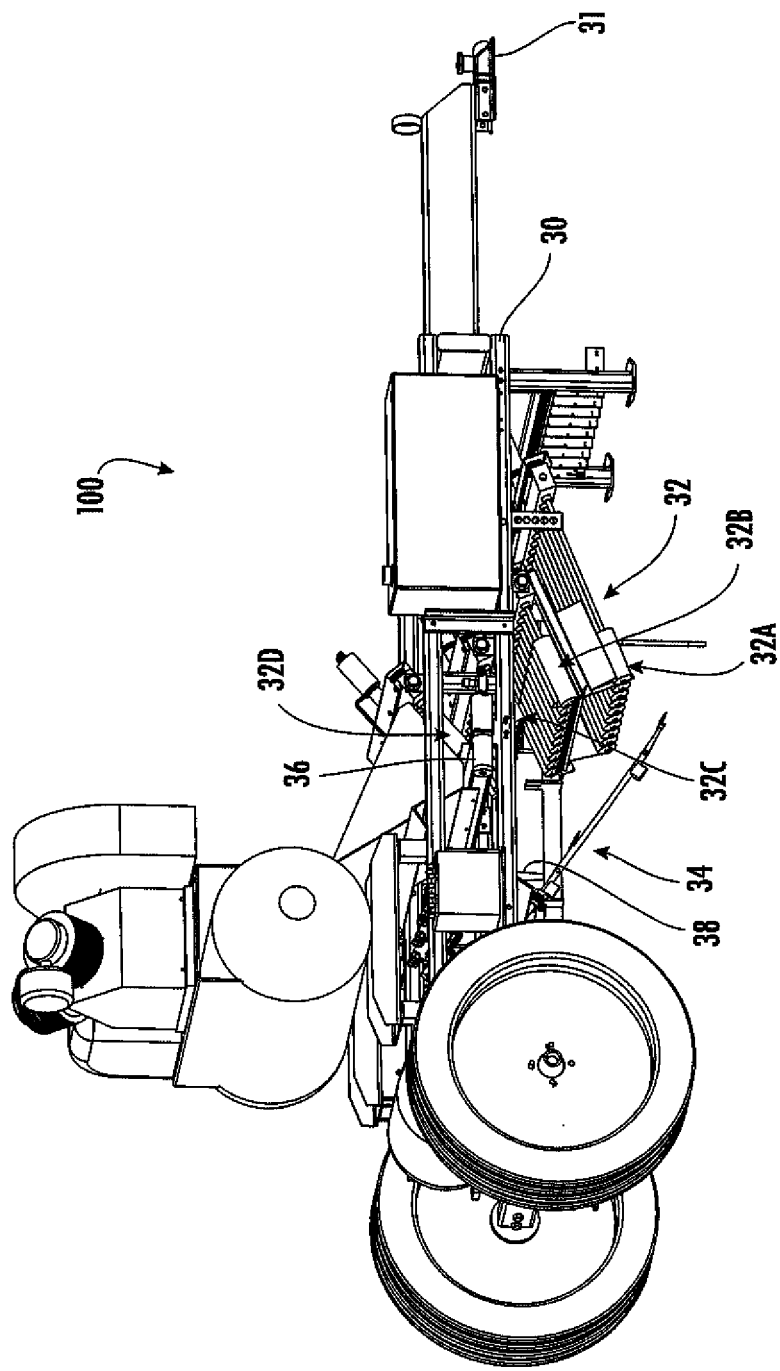
FIG. 8 is a perspective view of another embodiment of an asparagus harvester embodying features of the invention.

Reference is now directed to FIG. 8 illustrating an alternate embodiment of an asparagus harvester denoted generally at 100. In common with harvester 20, harvester 100 shares chassis 30, hitch 31, pick-up apparatus 32, including pick-up beds 32A, 32B, 32C, and 32D, severing apparatus 34, conveyor 36, lug box 38, and the various appurtenances thereof as previously described. As seen in FIG. 8 and also in FIG. 9, which is an enlarged fragmentary view corresponding to FIG. 8 illustrating portions of pick-up apparatus 32 in greater detail, pick-up apparatus 32 is configured with spear guides 110 and 112 and interference or interfering member 114. In this example, pick-up bed 32B immediately above lowermost pick-up bed 32A of pick-up apparatus 32 is configured with spear guides 110 and 112 and interference/interfering member 114.

Referring in relevant part to FIGS. 9-12, pick-up bed 32B, like each pick-up bed of pick-up apparatus 32, is characterized by the previously-described pick-up rollers 44 and 45. Pick-up rollers 44 and 45 are arranged in a transverse array from one side of pick-up bed 32B, denoted generally at 120, to the other side of pick-up bed 32B, denoted generally at 122, and are mounted for rotation about parallel axes X and Y, respectively, lying in longitudinal planes and parallel to each other. The opposite sides 120 and 122 of pick-up bed 32B also inherently define parts of the opposite sides of pick-up apparatus 32 defined collectively by the opposite sides of the various pick-up beds 32A, 32B, 32C, and 32D. Pick-up rollers 44 and 45 together define a leading or forward end of pick-up bed 32B denoted generally at 130, a trailing or aft end of pick-up bed 32B denoted generally at 132, and a length L of pick-up bed 32B in FIG. 11 extending rearwardly and longitudinally, as well as along the path of growing asparagus when harvester 100 brought to service to harvest growing asparagus spears, from leading end 130 to trailing end 132. The opposite leading and trailing ends 130 and 132 of pick-up bed 32B inherently constitute parts of the opposite leading and trailing ends of pick-up apparatus 32 collectively defined by the leading and trailing ends of the various pick-up beds 32A, 32B, 32C, and 32D.

As described previously, pick-up rollers 44 and 45 that constitute pick-up bed 32B, and also pick-up beds 32A, 32C, and 32D for that matter, form part of a pick-up unit and are each mounted for rotation in suitable journals 140 of a housing assembly 142 immediately to the front of pick-up rollers 44 and 45 and carry drive gears, housed in housing assembly 142, all in engagement with a common chain or belt, housed in housing assembly 142, appropriately connected to a drive shaft ultimately driven by motor 47 mounted to housing assembly 142. Pick-up rollers 44 and 45 are simultaneously rotated about axes X and Y, respectively, at substantially the same speed by motor 47, and the adjacent pick-up rollers 44 and 45 of each pair counter-rotate about the respective axes X and Y and thereby move with their closest portions having an upward component as is known in the art and described previously in conjunction with harvester 20. All of this is the same for each of pick-up beds 32A, 32B, 32C, and 32D. Spear guides 110 and 112 are disposed on either side of pick-up apparatus 32 for guiding the asparagus spears severed by severing apparatus 34 through pick-up apparatus 32 and currently disable the asparagus spears severed by severing apparatus 34 from ejecting laterally outward from either side of pick-up apparatus in the directions of arrows C and D in FIG. 9. Spear guides 110 and 112 are disposed on either side of pick-up apparatus 32 between pick-up beds 32A and 32B in this example.

Figure 12:
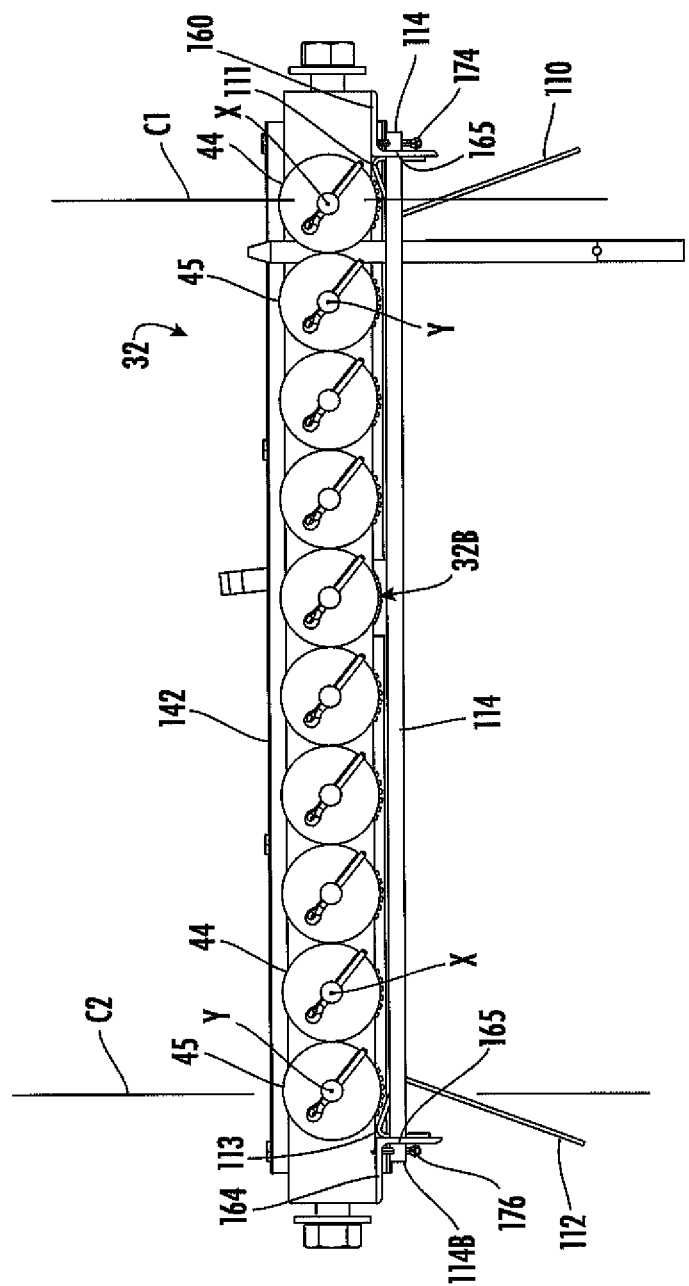
FIG. 12 is a rear elevation view of the embodiment of FIG. 10.

With continuing reference in relevant part to FIGS. 9-12, spear guides 110 and 112 are identical and are coextensive panels or shields of metal, which are each preferably flat and generally rectangular in shape in this example. Spear guides 110 and 112 are disposed proximate to the respective sides 120 and 121 of pick-up bed 32B, are axially-aligned, and depend downwardly from proximate to the respective sides 120 and 122 from under the respective outermost rollers 44 and 45 just inboard or otherwise inside of their respective longitudinal centerlines C1 and C2 and their respective axes of rotation X and Y in FIG. 12 present along the respective centerlines C1 and C2. Spear guides 110 and 112 project not only downwardly from just inboard or otherwise inside of their respective longitudinal centerlines C1 and C2 and their respective axes of rotation X and Y in FIG. 12 but also angularly outward therefrom and from the respective sides 120 and 122 of pick-up bed 32B. Spear guides 110 and 112 additionally extend forwardly along length L of pick-up bed 32B from proximate to trailing end 132 and to and beyond leading end 130 to between leading end 130 and housing assembly 142.

In this embodiment, spear guides 110 and 112 are mounted to and supported by support members 160 and 164 mounted proximate to the respective sides 120 and 122 of pick-up bed 32B. Support members 160 and 164 are parallel relative to one another, are rigid, rugged and elongate, are rigidly affixed to either end of housing assembly 142, such as by welding, fasteners, or the like, and project rearwardly from either end of housing assembly 142 along the respective sides 120 and 122 of pick-up bed 32B and terminate at outer ends 161 and 165, respectively, proximate to trailing end 132 of pick-up bed 32B. Spear guides 110 and 112 concurrently depend downwardly, and angularly outward as previously described, from respective upper ends 111 and 113 affixed to the respective support members 160 and 164 between housing assembly 142 and outer ends 161 and 165, respectively.

Figure 9:
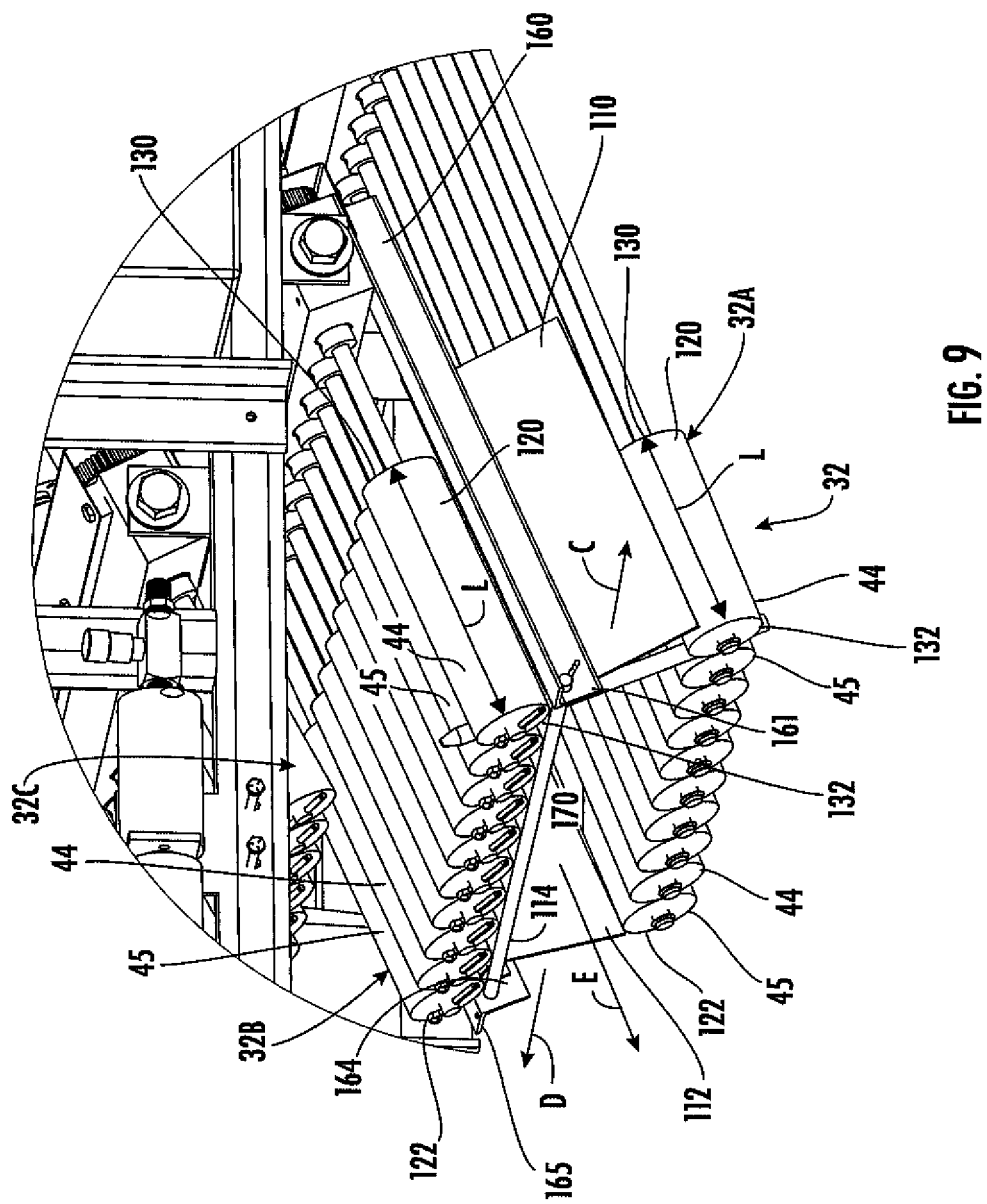
FIG. 9 is an enlarged fragmentary view corresponding to FIG. 8 illustrating pick-up beds of a pick-up apparatus.

In pick-up apparatus 32 in FIG. 9, spear guides 110 and 112 are present between pick-up beds 32A and 32B proximate to their respective sides 120 and 122. Spear guides 110 and 112 depend downwardly and angularly outward from the respective upper ends 111 and 112 affixed to the respective support members 160 and 164 from proximate to the respective sides 120 and 122 of pick-up bed 32B from under the respective outermost rollers 44 and 45 to along the respective sides 120 and 122 of the immediately subjacent lowermost pick-up bed 32A proximate to the outer side of its respective outermost rollers 44 and 45 at the respective sides 120 and 122. Spear guides 110 and 112 concurrently extend forwardly along lengths L of the respective pick-up beds 32B and 32A along the respective sides 120 and 122 of pick-up beds 32B and 32A from proximate to trailing ends 132 of the respective pick-up beds 32B and 32A and to and beyond the leading ends 130 of the respective pick-up beds 32B and 32A to define a spear-conveying area 170 in FIG. 10 that is laterally-enclosed on either side of pick-up apparatus 32 by spear guides 110 and 112 extending between pick-up beds 32B and 32A proximate to sides 120 and 122 of the respective pick-up beds 32B and 32A, according to the principle of the invention.

In the general operation of harvester 100 as first described above in conjunction with harvester 20, as chassis 30 advances along the rows of growing asparagus in the ground, asparagus spears become disposed in the appropriate alleys. A pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is of a sufficient height to trigger the corresponding sensor is engaged by the pair of adjacent pick-up rollers 44 and 45 of the lowermost pick-up bed 32A, which exert an upward force on the asparagus spear sufficient to hold it without uprooting it, and upon being severed by the severing assembly 50 is lifted upwardly thereby and handed off to and lifted in turn by the corresponding pair of adjacent pick-up rollers 44 and 45 of the succeeding pick-up beds 32B, 32C, and 32D, respectively, and ultimately cast onto conveyor 36 from the pair of adjacent pick-up rollers of the uppermost pick-up bed 32D and which transports it to the storage area. Pick-up rollers 44 and 45 of lowermost pick-up bed 32A lift severed asparagus spears from the ground and into and through spear-conveying area 170 enclosed laterally on sides 120 and 121 by spear guides 110 and 112 to the immediately superjacent pick-up bed 32B which, in turn, picks up the spears and lifts and transfers them to the next immediately superjacent pick-up bed 32C. Spear guides 110 and 112 between pick-up beds 32A and 32B on the respective sides 120 and 122 of each of pick-up beds 32A and 32B and thereby inherently on either side of pick-up apparatus 32 in FIG. 9 suitably guide severed asparagus spears lifting upwardly by pick-up rollers 44 and 45 proximate to the respective sides 120 and 122 from lowermost pick-up bed 32A and to the corresponding pick-up rollers 44 and 45 of pick-up bed 32B of pick-up apparatus 32. At the same time, pick-up guides 110 and 112 disable the severed asparagus spears so advancing upwardly through spear-conveying area 170 from the pick-up rollers 44 and 45 of lowermost pick-up bed 32A to the corresponding pick-up rollers 44 and 45 of the immediately superjacent pick-up bed 32B from ejecting laterally outward from between pick-up beds 32A and 32B from the spear-conveying area 170 from either of sides 120 and 121 of the respective pick-up bed 32A and 32B, and thus from either side of pick-up apparatus 32, in the opposite directions of arrows C and D, respectively, in FIGS. 9 and 10, thereby favorably influencing asparagus spear loss in accordance with the principle of the invention. Although spear guides 110 and 112 are disclosed between adjacent pick-up beds 32A and 32B to define laterally-enclosed spear-conveying area 170 therebetween in FIG. 9, suitable spear guides can be similarly disposed between any of the adjacent pick-up beds of pick-up apparatus 32 to define the appropriate laterally-enclosed spear-conveying area therebetween as may be desired.

Figure 10:
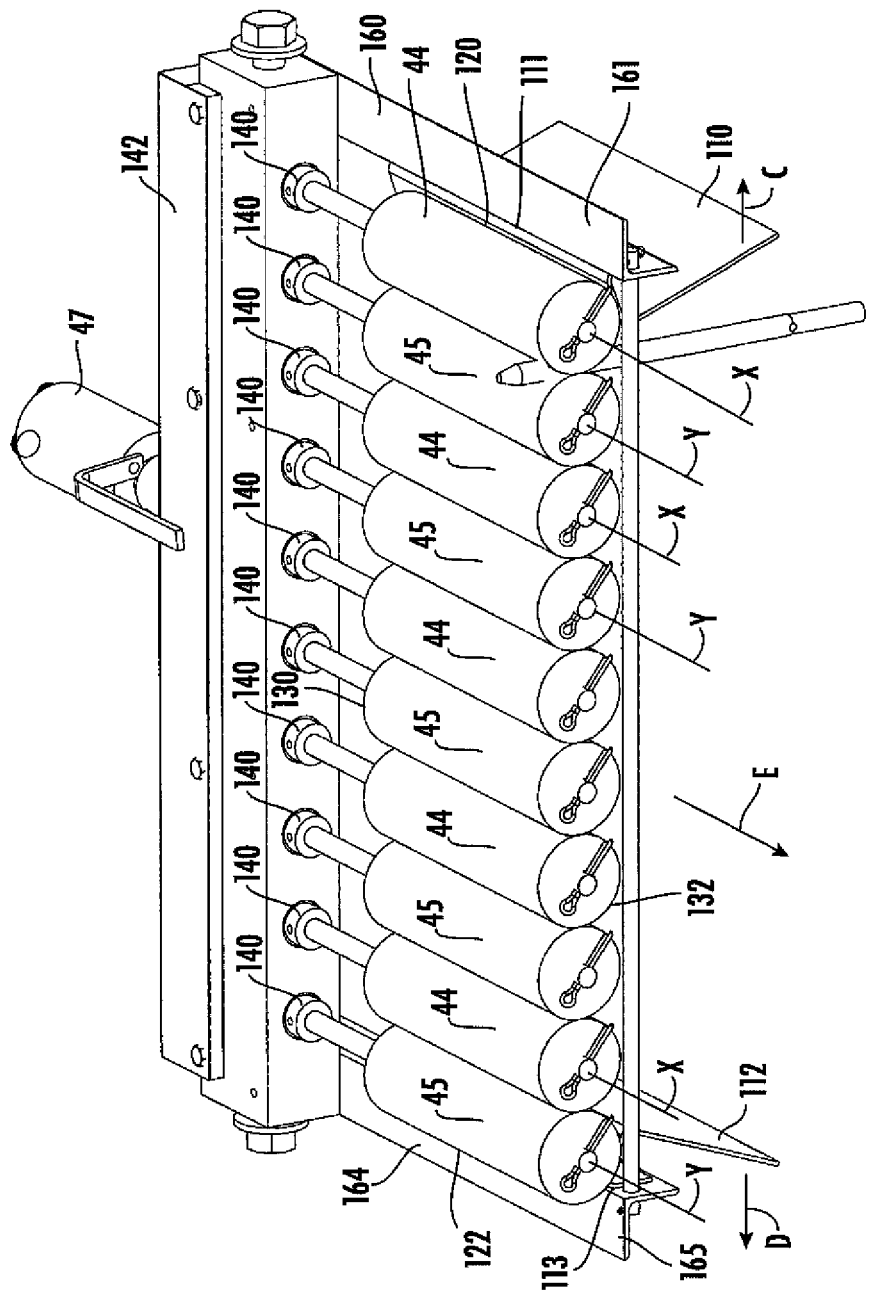
FIG. 10 is a perspective view of one of the pick-up beds illustrated in FIG. 9 incorporating spear guides and an interfering member.
Figure 11:
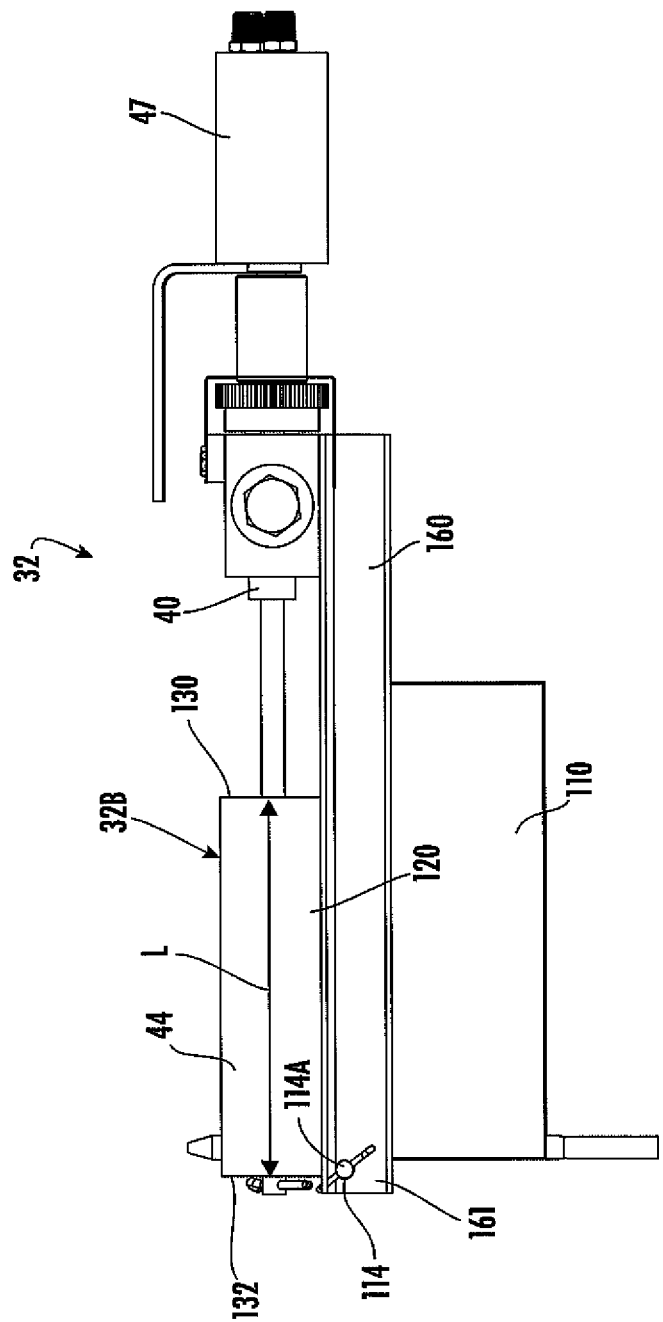
FIG. 11 is a side elevation view of the embodiment of FIG. 10, the opposite side elevation being the same thereof.

Referring in relevant part to FIGS. 9, 10, and 12, interfering member 114 extends across trailing end 132 of pick-up bed 32B from side 120 to side 12 and is configured to disable spears severed by severing apparatus 34 and being lifted through pick-up rollers 44 and 45 of pick-up bed 32B between leading end 130 and trailing end 132 from inadvertently passing outwardly and rearwardly in the direction of arrow E in FIGS. 9 and 10 through trailing end 132 of pick-up bed 32B and onto the ground only to become lost, thereby favorably influencing asparagus spear loss in accordance with the principle of the invention. In other words, interfering member 114 extends across trailing end 132 of pick-up bed 32B across the trailing ends of the various pick-up rollers 44 and 45 from side 120 to side 121 to keep severed asparagus spears entrained between the spaces of various pick-up rollers 44 and 45 and prevent them from discharging rearwardly from between the various pick-up rollers 44 and 45 and relieved from their entrainment while they are being lifted. Interfering member 114 is a longitudinally straight elongate bar carried or otherwise supported by support members 160 and 164. In this example, interfering member 114 has opposed ends 114A and 114B. End 114A is connected to outer end 161 of support member 160 disposed proximate to side 120 of pick-up bed 32B and end 114B, end 114B is connected to outer end 161 of support member 164 disposed proximate to side 122 of pick-up bed 32B. Interfering member 114 extends transversely across trailing end 132 of pick-up bed 32 from end 114A connected to outer end 161 of support member 160 proximate to side 120 of pick-up bed 32B to end 114B connected to outer end 165 of support member 164 proximate to side 122. In this embodiment, ends 114A and 114B extend through appropriate holes in the respective outer ends 161 and 165 and are secured with removable pins 174 and 176, respective, shown in FIG. 12. Ends 114A and 114B can be secured by other methods in alternate embodiments, such as by welding if so desired.

The trailing end 132 of the lowermost pick-up bed 32A has no interfering member for enabling short asparagus spears not severed by severing apparatus 34 to pass outwardly through its trailing end 12 from between rollers 44 and 45. Although only pickup bed 32B immediately above lowermost pickup bed 32A incorporates interfering member 114, pick-up beds 32C and 32D can be selectively configured with an interfering member if desired.

Figure 13:
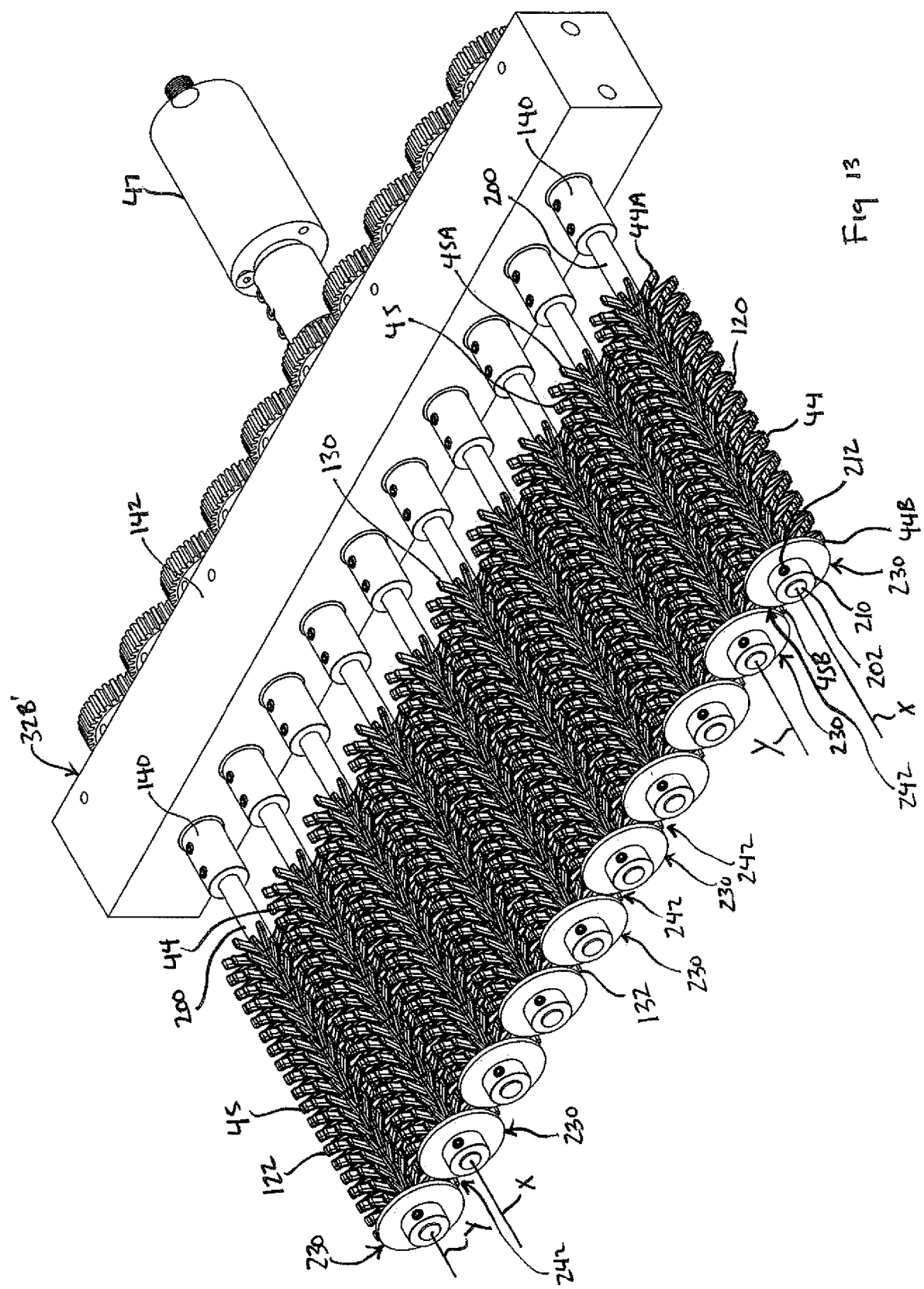
FIG. 13 is a perspective view of an alternate embodiment of a pick-up bed embodying features of the invention.

FIG. 13 illustrates an alternate embodiment of pick-up bed 32B embodying features of the invention and denoted with a prime ("'") symbol to differentiate it from the previously-described pick-up bed 32B. Pick-up bed 32B of pick-up apparatus 32 of harvester 20 is replaced with pick-up bed 32B'. The operation of pick-up apparatus 32 with pick-up bed 32B replaced with pick-up bed 32B' is the same as discussed above with the exception that the operation of pick-up apparatus 32 and harvester 20 is improved with the improvement of the interfering members 230 embodied in pick-up bed 32B'.

Referring in relevant part to FIGS. 13-18, pick-up bed 32B', like each pick-up bed of pick-up apparatus 32, has the previously-described pick-up rollers 44 and 45 arranged in a transverse array from one side 120 of pick-up bed 32B' to the other side 122 of pick-up bed 32B'. Pick-up rollers 44 and 45 are mounted for rotation about the previously-described parallel axes X and Y, respectively. The opposite sides 120 and 122 of pick-up bed 32B' define parts of the opposite sides of pick-up apparatus 32 defined collectively by the opposite sides of the various pick-up beds 32A, 32B, 32C, and 32D described previously. For illustration and reference, pick-up rollers 44 each have a leading end 44A and a trailing end 44B, and pick-up rollers 45 each have a leading end 45A and a trailing end 45B. Leading ends 44A and 45A of the various pick-up rollers 44 and 45 define the leading or forward end 130 of pick-up bed 32B'. Trailing ends 44B and 45B of the various pick-up rollers 44 and 45 together define the trailing or aft end 132 of pick-up bed 32B'. The various pick-up rollers 44 and 45 define the length L of pick-up bed 32B' in FIGS. 14 and 15 from leading end 130 to trailing end 132. The opposite leading and trailing ends 130 and 132 of pick-up bed 32B' constitute parts of the opposite leading and trailing ends of the pick-up apparatus incorporating pick-up bed 32B'.

As described previously, pick-up rollers 44 and 45 of pick-up bed 32B' are identical and customarily provided with relatively rigid cores and with surrounding coverings of yieldable, relatively soft material such as foam rubber or the like in the form of pads or fingers shown in this example.

According to standard practice, the cores of pick-up rollers 44 and 45 are mounted to and arranged about corresponding shafts 200. The various shafts 200 are identical and mounted in standard, suitable journals 140 of housing assembly 142. Shafts 200 carry the customary drive gears engaged directly or with a common chain or belt appropriately connected to a drive shaft ultimately driven by motor 47. Pick-up rollers 44 and 45 are simultaneously rotated about axes X and Y, respectively, at substantially the same speed when shafts 200 are rotated by motor 47. Each designated pair of adjacent pick-up rollers 44 and 45 counter-rotate about the respective axes X and Y and thereby move with their closest portions having an upward component as is known in the art.

According to the invention, rollers 44 and 45 each incorporate an interfering member 230. Interfering members 230 are independent of each other and do not directly engage or contact one another. Each interfering member 230 relates to one of the various pick-up rollers 44 and 45. An interfering member 230 is mounted to each pick-up roller 44 proximate to its trailing end 44B and each pick-up roller 45 proximate to its trailing end 45B.

Each designated pair of adjacent interfering members 230 of each designated pair of adjacent pick-up rollers 44 and 45 are "sufficiently juxtaposed." This means that each designated pair of interfering members 230 are sufficiently close together to enable them to block and thereby disable severed asparagus spears from passing outwardly therebetween from between the trailing ends 44B and 45B. This occurs when the severed asparagus spears are being engaged and lifted by and between the pick-up rollers 44 and 45 between the leading end and the trailing end of each pick-up roller when the pick-up rollers 44 and 45 are actuated for counter-rotation.

Figure 14:
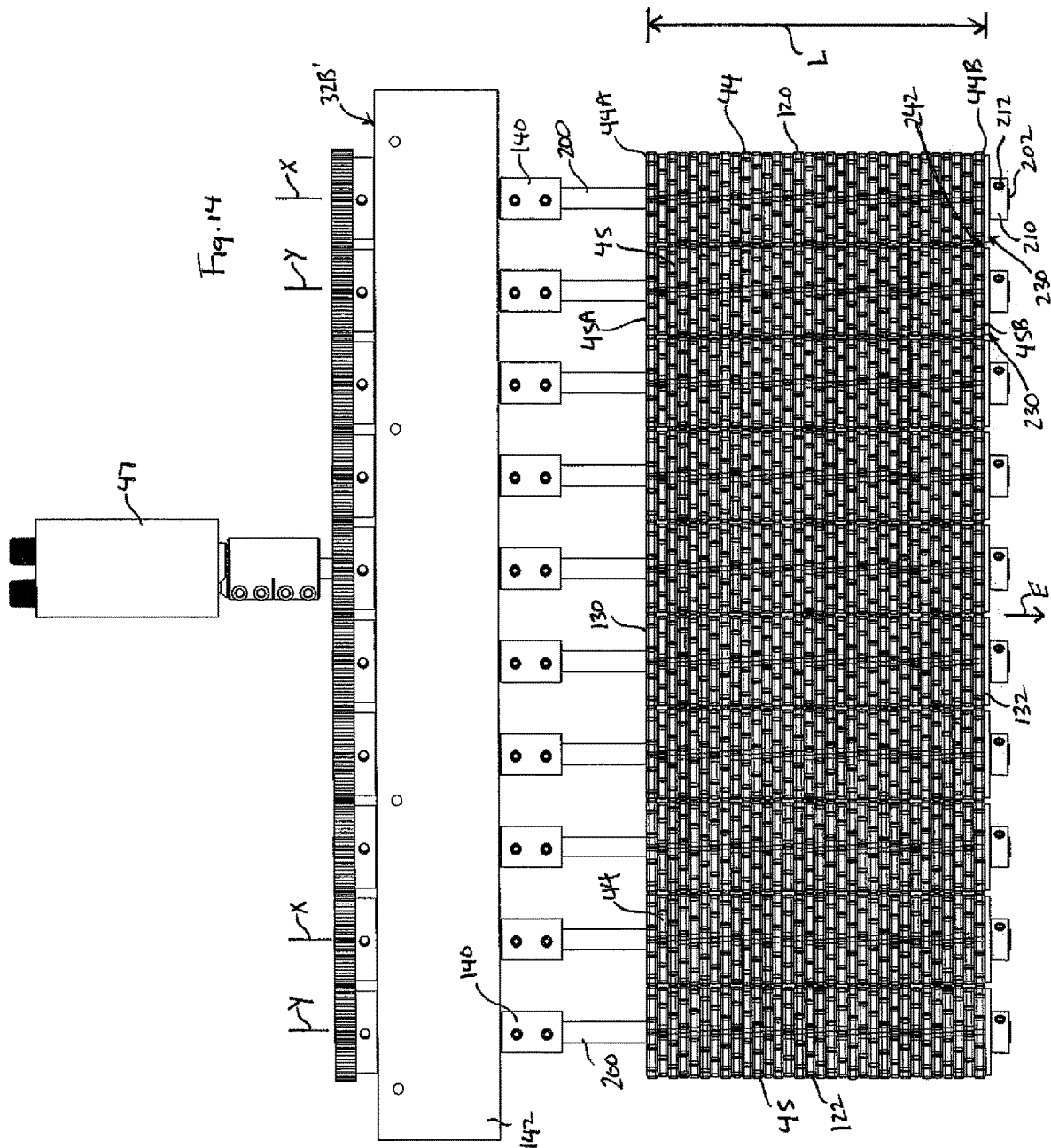
FIG. 14 is a top plan view of the embodiment of FIG. 13.
Figure 15:
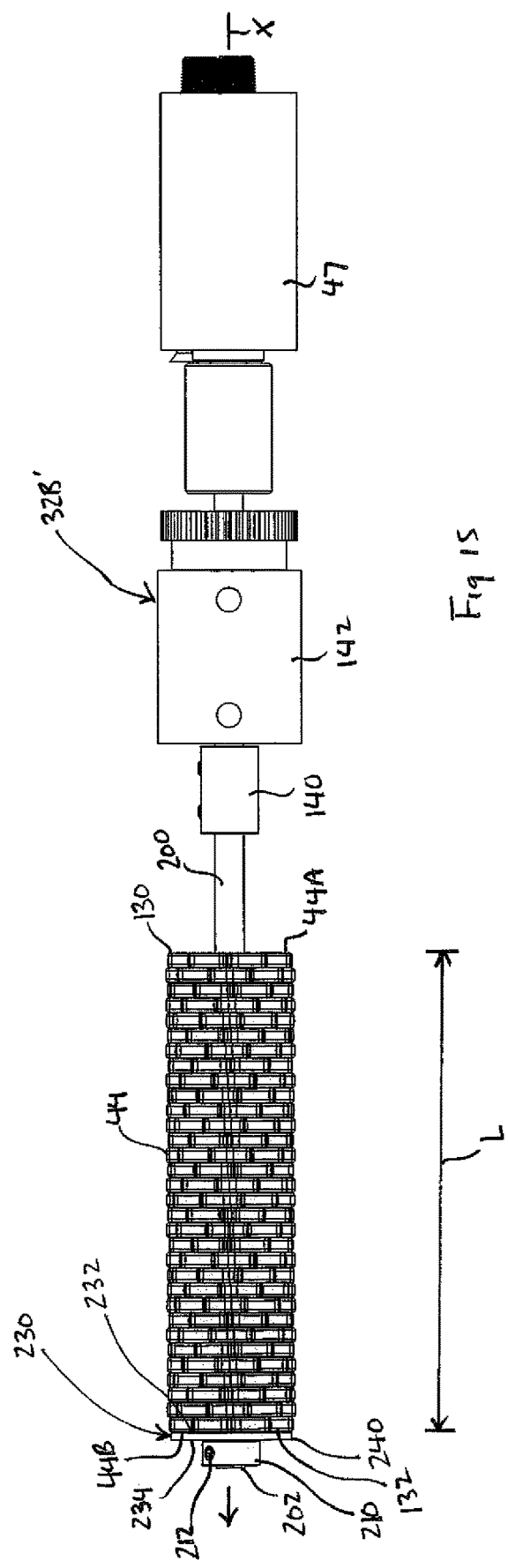
FIG. 15 is a side elevation view of the embodiment of FIG. 13, the opposite side elevation view being the same thereof.
Figure 16:
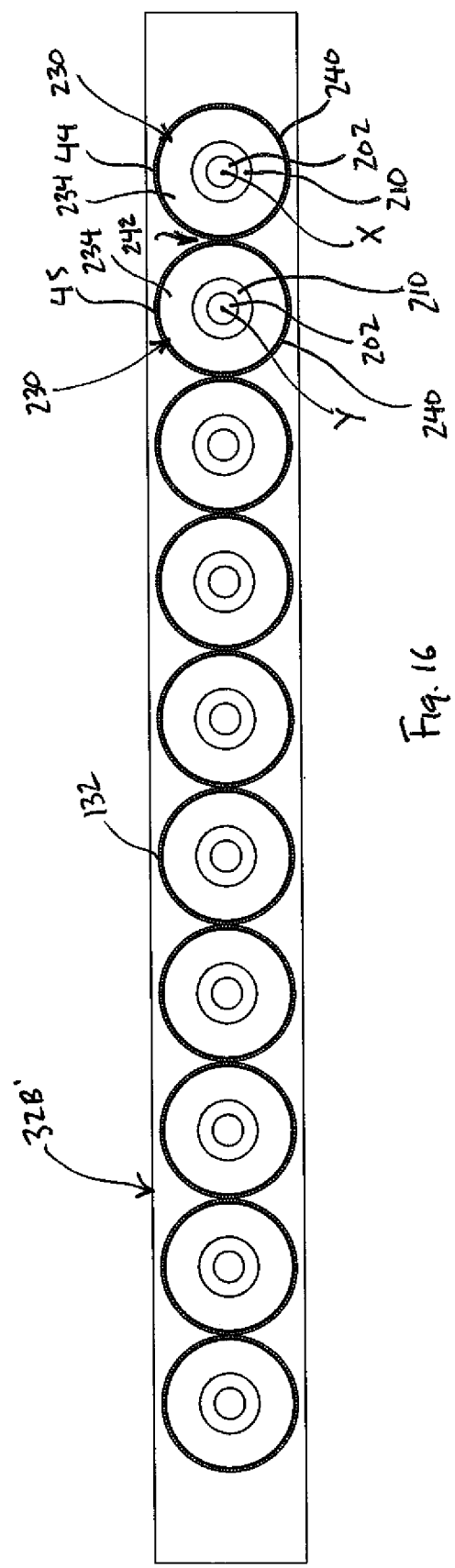
FIG. 16 is a rear elevation view of the embodiment of FIG. 13.
Figure 17:
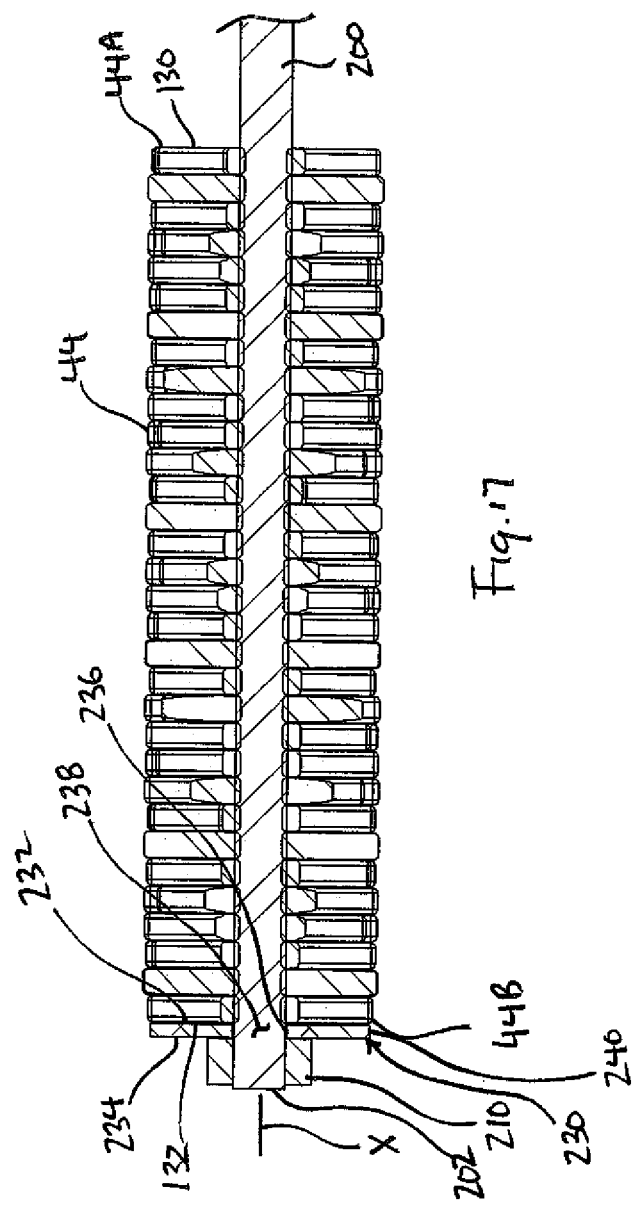
FIG. 17 is a section view along line 17-17 of FIG. 14.
Figure 18:
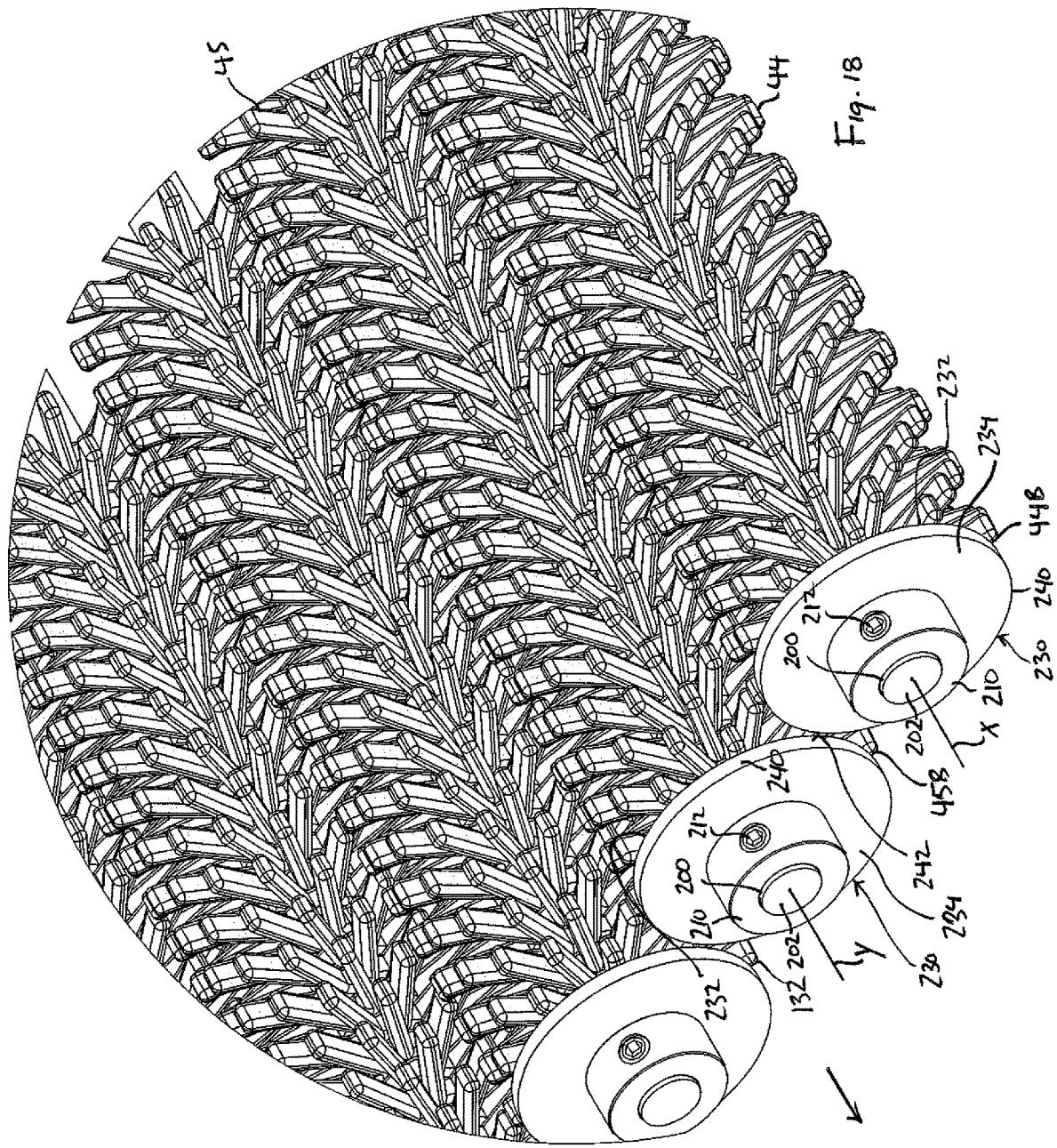
FIG. 18 is an enlarged, fragmentary perspective view corresponding to FIG. 13.

Interfering members 230 are identical in every respect and identically mounted to the various pick-up rollers 44 and 45. For example, FIG. 17 is a section taken along line 17-17 of FIG. 14 illustrating the corresponding roller 44 arranged about shaft 200, which includes a free end 202 that extends beyond trailing end 44B. A collar 210 fit over free end 202 and secured to it with a standard set screw 212 in FIGS. 13-15 entraps an interfering member 230 applied over shaft 200 between collar 210 and roller's 44 trailing end 44B. In FIGS. 17 and 18, interfering member 230 is a standard, circular washer, a flat ring of metal including inner and outer parallel radial surfaces 232 and 234 extending radially outward from a circular inner edge 236 encircling an opening 238 in FIG. 17 through which shaft 200 extends to a circular outer edge 240 in FIGS. 17 and 18 that is proximate to the outer diameter of roller 44 and that defines a constant, circular outer diameter of interfering member 230. Collar 210 and interfering member 230 are arranged coaxially about axis X of rotation X of roller's 44 shaft 200. Trailing end 44B of roller 44 is in direct contact against inner radial surface 232, collar 210 is in direct contact against outer radial surface 234, and interfering member 230 is effectively clamped and entrapped by and between collar 210 and roller's 44 trailing end 44B, which causes the interfering member 230 to rotate with the rotation of roller 44. Rollers 44 and 45 of pick-up bed 32B' are each identically configured with an interfering member 230.

In FIG. 18, the closest portions of each designated pair of adjacent interfering members 230 are the circular outer edges 240, being separated only by a small gap 242 that is sufficiently small to disable an asparagus spear suitable for harvesting from passing through it. The circular outer edges 240, the closest portions of the adjacent interfering members that correspond to the closest portions of the designated pair of adjacent pick-up rollers 44 and 45 having the inherent upward component, are thus "sufficiently juxtaposed" or otherwise sufficiently close together to enable the interfering members 230 to work in concert by their inner radial surfaces 232 and outer edges 240 interacting with and blocking or otherwise obstructing severed asparagus spears from passing outwardly from between the interfering members 230 through gap 242 from between the trailing ends 44B and 45B and onto the ground only to become lost when the severed asparagus spears are being engaged and lifted by and between the pick-up rollers 44 and 45 between the leading end and the trailing end of each pick-up roller when the pick-up rollers 44 and 45 are actuated for counter-rotation, thereby favorably influencing asparagus spear loss in accordance with the principle of the invention. The interfering members 230 counter-rotate with the various pick-up rollers 44 and 45 when they are actuated for counter-rotation while remaining sufficiently juxtaposed as herein described because of their described circular configuration.

In the general operation of harvester 20 with pick-up bed 32B replaced with pick-up bed 32B', as chassis 30 advances along the rows of growing asparagus in the ground, asparagus spears become disposed in the appropriate alleys. A designated pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is suitable for harvesting, being of a sufficient height to trigger the corresponding sensor, is engaged by the pair of adjacent pick-up rollers 44 and 45 of the lowermost pick-up bed 32A, which exert an upward force on the asparagus spear sufficient to hold it without uprooting it, and upon being severed by the severing assembly 50 is lifted upwardly thereby and handed off to and lifted in turn by the corresponding pair of adjacent pick-up rollers 44 and 45 of the succeeding pick-up beds 32B', 32C, and 32D, respectively, and ultimately cast onto conveyor 36 from the pair of adjacent pick-up rollers of the uppermost pick-up bed 32D and which transports it to the storage area. Pick-up rollers 44 and 45 of lowermost pick-up bed 32A lift severed asparagus spears from the ground to the immediately superjacent pick-up bed 32B' which, in turn, picks up the spears and lifts and transfers them to the next immediately superjacent pick-up bed 32C.

Interfering members 230 of pick-up bed 32B' serve to block the spears severed by severing apparatus 34 and being lifted through pick-up rollers 44 and 45 of pick-up bed 32B' between leading end 130 and trailing end 132 from passing outwardly and rearwardly in the direction of arrow E in FIGS. 13-15 and 18 through trailing end 132 of pick-up bed 32B' and onto the ground only to become lost, thereby favorably influencing asparagus spear loss according to the invention. The designated pairs of adjacent interfering members 230 mounted directly to the designated pairs of the various pick-up rollers 44 and 45 extend across trailing end 132 of pick-up bed 32B across the trailing ends of the various pick-up rollers 44 and 45 from side 120 to side 121 and keep severed asparagus spears entrained between the spaces of the designated pairs of pick-up rollers 44 and 45 and prevent them from discharging rearwardly from between the various designated pairs of pick-up rollers 44 and 45 and being relieved from their entrainment while they are being lifted.

Figure 19:
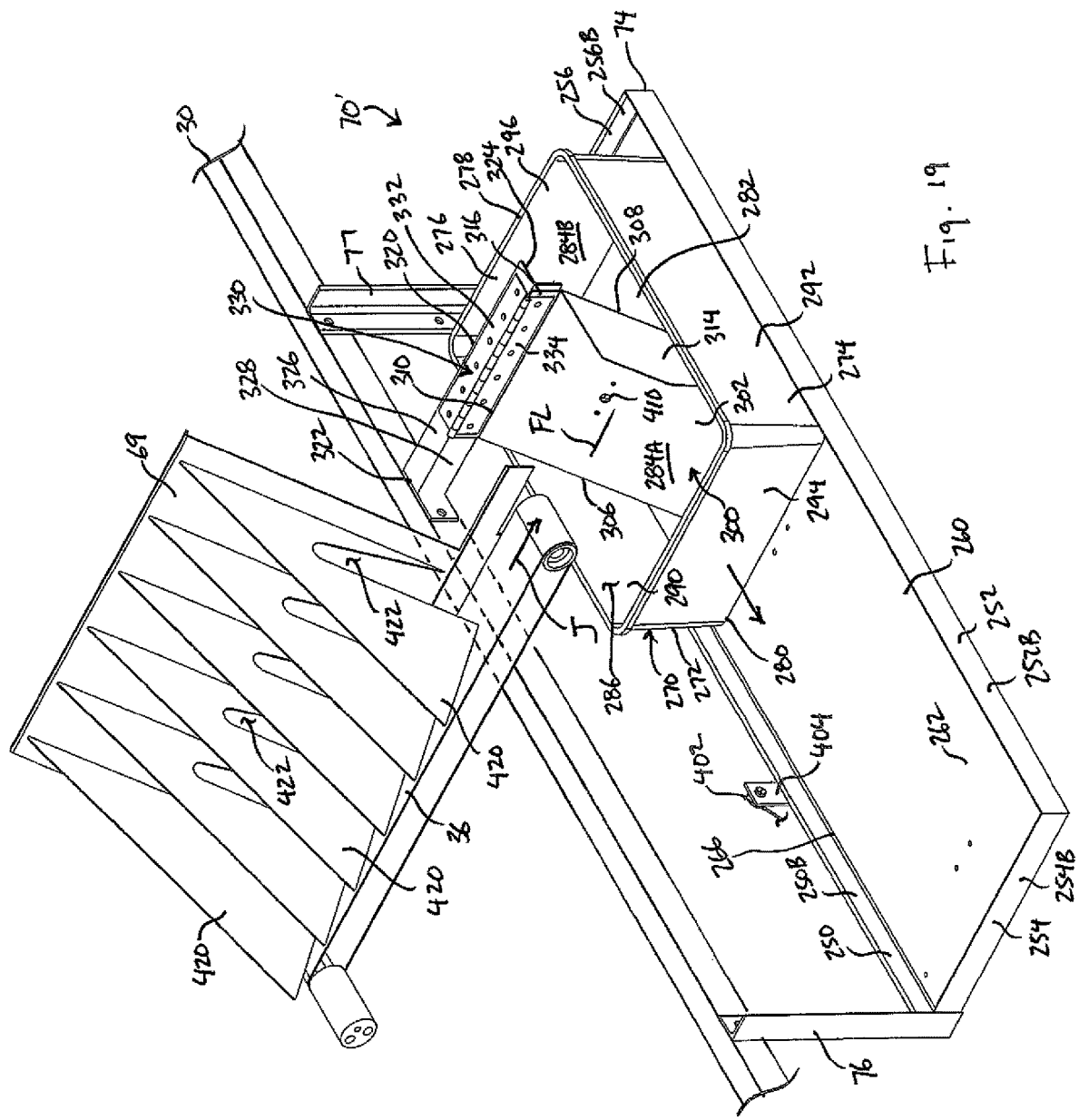
FIG. 19 is a front perspective view of an asparagus collection and storage apparatus embodying features of the invention and for use with an asparagus harvester.

Shown in FIG. 19 is an alternate embodiment of an asparagus collection and storage apparatus 70 embodying features of the invention and denoted with a prime ("'") symbol to differentiate it from apparatus 70 of previously-described harvester 20. Apparatus 70 of the previously-described harvester is replaced apparatus 70' in an exemplary embodiment. The operation of harvester 20 with apparatus 70 replaced with apparatus 70' is described briefly below. As described above with harvester 20, conveyor 36 mounted at a fixed position and is configured to receive from pick-up apparatus 32 and convey away asparagus spears severed by severing apparatus 34 to apparatus 70' when it replaces apparatus 70.

Referring in relevant part to FIGS. 19-23, apparatus 70' includes framework 72, including horizontal frame 74 affixed to and extending outwardly from the lower ends of opposed supports 76 and 77 extending upright from frame 74 under conveyor 36 to their upper ends affixed to chassis 30. Frame 74 is a rectangular perimeter frame including opposed parallel sides 250 and 252 that extend longitudinally along chassis 30 between opposed parallel ends 254 and 256. Side 250 is the inner side of frame 74 near chassis 30, side 252 is the outer side of frame 74, end 254 is the leading end of frame 74, and end 256 is the trailing end of frame 74. Sides 250 and 252 are equal in length and are longer than ends 254 and 256 that are equal in length. This configuration forms the rectangular shape of frame 74. Frame 74 surrounds, supports, and is affixed to perimeter extremity 266 of a robust, rugged, horizontal platform 260 of metal or plastic that includes an upper surface 262 under and facing conveyor 36 and an opposed lower surface 264 that supports part of a drive assembly 350. Platform 260 is an extension of frame 74 and is considered part of it.

Sides 250 and 252 and ends 254 and 256 are angle bars. The angle bars have identical vertical cross-sections of horizontal and vertical components along their respective lengths. For reference purposes, side 250 has horizontal and vertical components 250A and 250B, side 252 has horizontal and vertical components 252A and 252B, end 254 has horizontal and vertical components 254A and 254B, and end 256 has horizontal and vertical components 256A and 256B. Lower surface 264 of perimeter extremity 268 of platform 260 rests atop horizontal components 250A, 252A, 254A, and 256A. Welding, rivets, or other joinery secures perimeter extremity 266 to horizontal components 250A, 252A, 254A, and 256A. Vertical components 250B, 252B, 254B, and 256B extend upright from platform's 260 perimeter extremity 266 to define frame's 74 perimetric rim that confines the longitudinal translation of a lug box or bin 270 across upper surface 262 of platform 260.

Upper surface 262 of platform 260 supports bin 270 under and open to receive and temporarily store severed asparagus spears from conveyor 36 during harvesting operations. Drive assembly 350 is operatively coupled or otherwise operatively engaged to bin 270 and displace it slidably across upper surface 262 along a longitudinal displacement path denoted by arrow F between bin's 270 stations when drive assembly 350 actuates. Bin's 270 stations include a first or rearward station in FIGS. 19, 21, and 22 toward frame's 74 end 256 and a second or forward station toward frame's 74 end 254 away from end 256 in FIGS. 29 and 30. Bin 270 is open to receive and temporarily store severed asparagus spears from conveyor 36 at each of its first and second stations and all stations therebetween, all of which are considered bin's "filling" stations, i.e., stations where bin 270 is positioned to accept severed asparagus spears from conveyor 36 during harvesting operations.

Bin 270, a rugged metal or plastic container, includes continuous sidewall 272 having outer surface 274, inner surface 276, upper edge 278, lower edge 280, and horizontal bottom 282 affixed to lower edge 280. Continuous sidewall 272 extends upright from bottom 280 supported slidably directly against upper surface 262 to upper edge 278 encircling opening 286 to bin's 270 volume 284 defined by bottom 280 and inner surface 276. Bin's 270 volume 284 is open to receive severed asparagus spears through opening 286 from conveyor 36 while bin 270 is disposed along path F at its rearward station, its forward station, and all stations therebetween, such as the station of bin 270 in FIG. 27 disposed between bin's 270 rearward and forward stations. Therefore, opening 286 to volume 284 is open to conveyor 36 to receive asparagus spears from conveyor 36 while bin 270 is disposed along path F at its filling stations, namely, its rearward station, its forward station, and any station therebetween.

Continuous sidewall 272 includes opposite side walls 290 and 292 that extend between opposite end walls 294 and 296. Side walls 290 and 292 define either side of bin 270 and are equal in length and longer than end walls 294 and 296, which are equal in length and define either end of bin 270. Side walls 290 and 292 flank either side of volume 284. End walls 294 and 296 flank either end of volume 284. Bin 270 is rectangular in this example, in which side walls 290 and 292 are perpendicular relative to end walls 294 and 296, and the length of bin 270 from end wall 294 to end wall 296 is greater than the width of bin 270 from side wall 290 to side wall 292.

Bottom 282 of bin 270 rests directly against upper surface 262 of bin 270. Bottom 282 extends across upper surface 262 of platform 260 laterally from side wall 290, the inner side of bin 270 adjacent to the vertical component 250B of the inner side 250 frame 74, to side wall 292, the outer side of bin 270 adjacent to the vertical component 252B of the outer side 252 of frame 74. Bin 270 extends across upper surface 262 of platform longitudinally from end wall 294, the leading end of bin 270 directed toward the vertical component 254B of the leading end 254 of frame 74, to end wall 296, the trailing end of bin 270 directed toward the vertical component 256B of the trailing end 256 of frame 74. Bin 270 is between leading and trailing ends 254 and 256 of frame 74 and inner and outer sides 250 and 252 of frame 74. Bottom 282 can simply slide longitudinally over and across upper surface 262 of platform 260 along path F, in which case bin 270 can displace slidably across upper surface 262 of platform 260 relative to the overlying conveyor 36 longitudinally along path F between its rearward station in FIGS. 19, 21, and 22 and its forward station in FIGS. 29 and 30. Frame's 74 vertical components 250B and 252B flank the respective side walls 290 and 292 and serve as confining rails constraining bin's 270 longitudinal displacement along displacement path F. Frame's 74 vertical components 254B and 256B flank the respective end walls 295 and 296 and serve as confining stops disabling bin 270 from moving forwardly in the direction of arrow F beyond vertical component 254B and rearwardly in the opposite direction beyond vertical component 256B.

Apparatus 70' incorporates a partition 300 in FIGS. 19-25, a dividing wall of metal or plastic mounted at a fixed position. In FIGS. 19, 21, 23, 24, and 25, partition 300 in volume 284 of bin 270 between side walls 290 and 292 and end walls 294 and 296 in FIGS. 19, 21, and 23 and transversely compartments or otherwise divides bin's 270 volume 284 into a first confined volume 284A and a second confined volume 284B. Confined volume 284A extends between partition 300 and bin's 270 end wall 294. Confined volume 284B extends between partition 300 and bin's 270 end wall 296. Confined volume 284A is the forward confined volume of bin 270 ahead of confined volume 284B, the aft or rear confined volume of bin 270.

Partition 300 separates confined volume 284A from confined volume 284B. Bin 270 displaces along path F between its rearward and forward stations relative to partition 300. Partition 300 remains in bin 270 dividing bin's volume 284 into the described confined volumes 284A and 284B at each of bin's 270 filling stations and when bin 270 displaces longitudinally along path F relative to partition 300 between bin's 270 rearward and forward stations. Confined volume 284A is open to receive severed asparagus spears deposited into it through opening 286 open to conveyor 36 when bin 270 is in its rearward station in FIGS. 19 and 21, its forward station in FIG. 29, and all stations therebetween. Confined volume 284A has a first size when bin 270 is in its rearward station in FIGS. 19 and 21 and a second greater size when bin 270 is in its forward station in FIG. 29. The size of confined volume 284A increases with bin's 270 movements from its rearward station to its forward station. At the same time, confined volume 284B has a first size when bin 270 is in its rearward station in FIGS. 19 and 21 and a second lesser size when bin 270 is in its forward station in FIG. 29. The size of confined volume 284B decreases with bin's 270 movements from its rearward station to its forward station.

Referring in relevant part to FIGS. 19, 21, 23, 24, and 25, partition 300 is a flat panel including opposed, parallel surfaces 302 and 304, opposed parallel side edges 306 and 308, and opposed parallel upper and lower edges 310 and 312. Surface 302 is the front surface of partition 300. Surface 304 is the rear surface of partition 300. Partition 300 is configured with a backstop 314 and a mounting plate 316. Backstop 314, a flat panel, is perpendicular to front surface 302 and extends forwardly relative to front surface 302. Mounting plate 316 defines partition's 300 upper end or extremity. Mounting plate 316 extends upwardly from upper edge 310 along the width of partition 300 from side edge 306 to side edge 308. Partition 300 and its backstop 314 are normally in a lowered position lowered into volume 284 through bin's 270 opening 286, in which they concurrently extend downward, and angularly forward in the direction of end wall 294, into bin's 270 volume 284 through opening 286 to lower edge 312 at bin's 270 bottom 282 from mounting plate 316 mounted at a fixed position over bin's 270 opening 286 aft of conveyor 36. Partition 300, including its front and rear surfaces 302 and 304, extends laterally across volume 284 from side edge 306 adjacent to the flanking inner surface 276 of side wall 290 to side edge 308 and backstop 314 adjacent to the flanking inner surface 276 of side wall 296 opposite to conveyor 36 dividing volume 284 transversely into forward and aft confined volume 284A and 284B. Front surface 302 of partition 300 and inner surface 276 of end wall 294 and side walls 290 and 292 extending forwardly from front surface 302 to end wall 294 define confined volume 284A. Rear surface 304 of partition 300 and inner surface 276 of end wall 296 and side walls 290 and 292 extending rearwardly from rear surface 302 to end wall 296 define confined volume 284B. Backstop 314 perpendicular to front surface 302 extends forwardly relative to front surface 302 along inner surface 276 of sidewall 292 toward end wall 294 in FIGS. 19 and 21 from side edge 308 along the height of partition 300 from upper edge 310 to lower edge 312.

Figure 21:
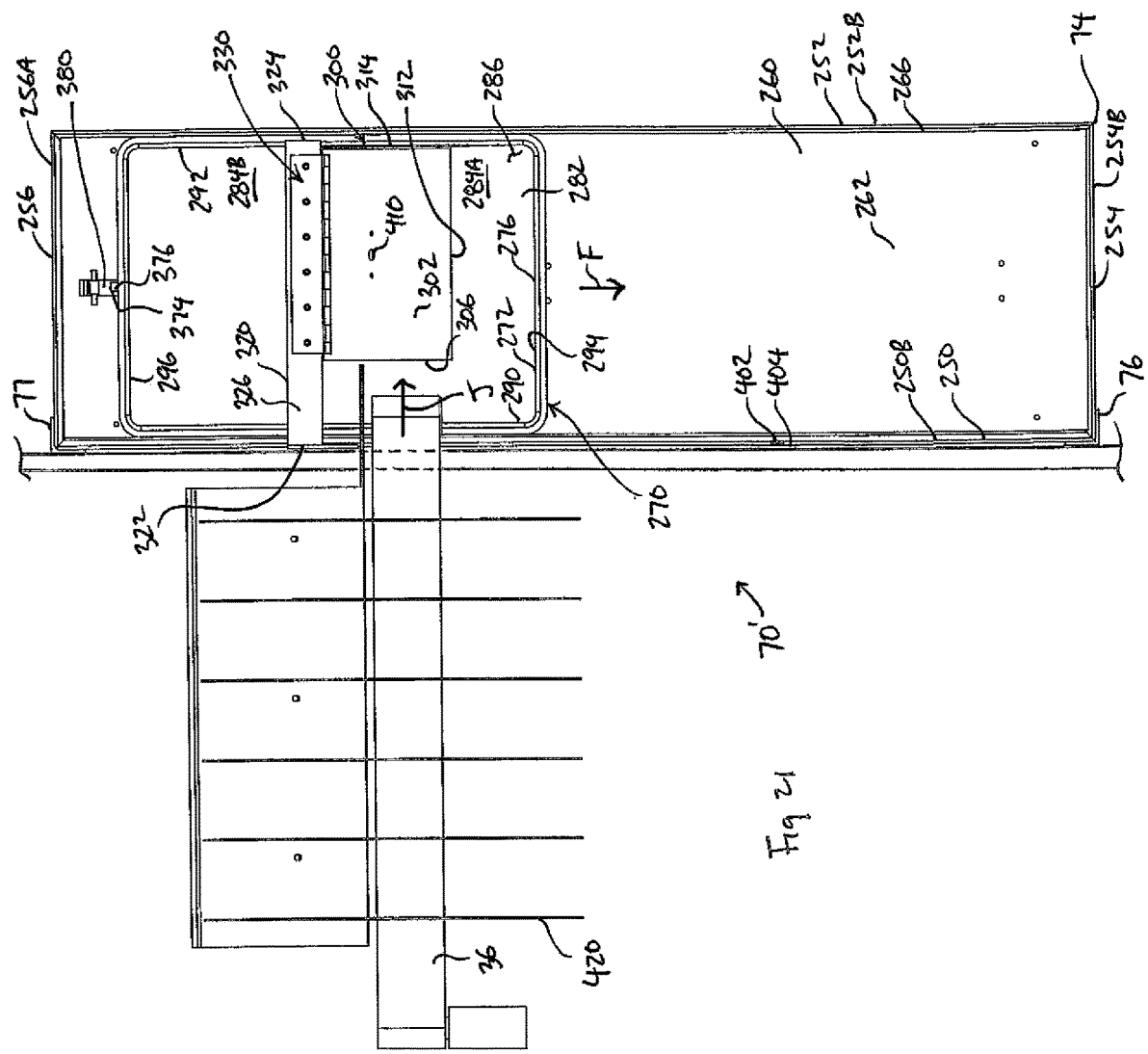
FIG. 21 is a top plan view of the embodiment of FIG. 19.

Confined volume 284A extending forwardly from front surface 302 to end wall 294 has its first size when bin 270 is in its rearward station in FIGS. 19 and 21 and its second greater size when bin 270 is in its forward station in FIG. 29. The size of confined volume 284A extending forwardly from front surface 302 to end wall 294 increases with bin's 270 movements relative to partition 300 from its rearward station to its forward station. At the same time, confined volume 284B extending rearwardly from rear surface 304 to end wall 296 has its first size when bin 270 is in its rearward station in FIGS. 19 and 21 and its second lesser size when bin 270 is in its forward station in FIG. 29. The size of confined volume 284B extending rearwardly from rear surface 304 to end wall 296 decreases with bin's 270 movements relative to partition 300 from its rearward station to its forward station. Partition's 300 lower edge 312 slides across bottom 282 when bin 270 displaces relative to partition 300.

Figure 24:
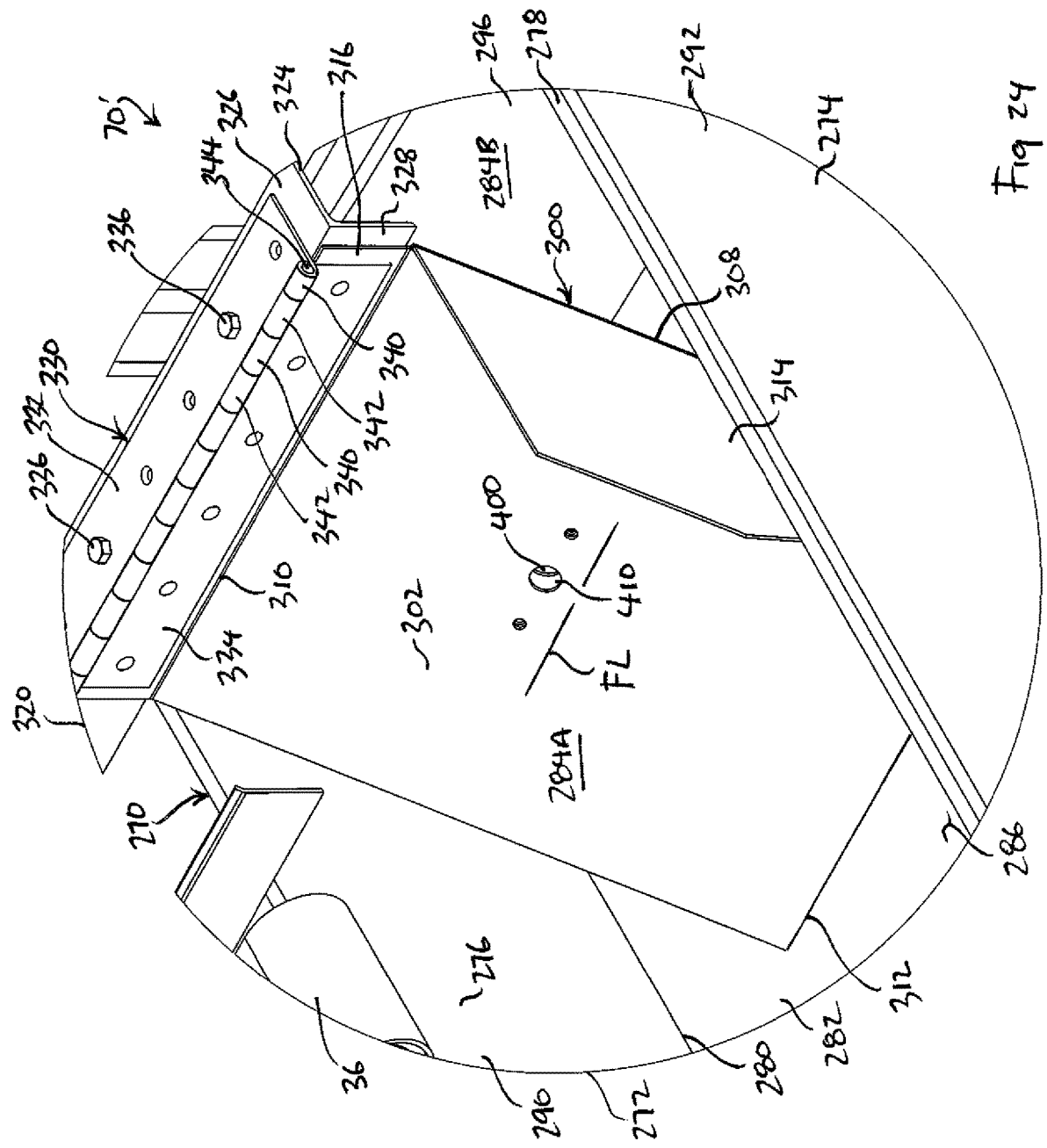
FIG. 24 is an enlarged view of the circled portion of the embodiment of FIG. 19.

In FIGS. 19 and 24, plate 316 is mounted at its fixed position over bin's 270 opening 286 to a support member 320 by a hinge 330. Support member 320 is elongate, is aft of conveyor 36 above opening 286 to bin's 270 volume 284, and extends laterally outward from an inner end 322 affixed to chassis 30 to an outer end 324. Support member 320 is an angle bar having a horizontal component 326 and a vertical component 328.

In FIG. 24, hinge 330, which is of standard construction, includes a first plate 332 atop and affixed to horizontal component 326 by welding or suitable fasteners and a second plate 334 affixed by welding or suitable fasteners to partition's 300 mounting plate 316 extending across vertical component 328. First plate 332 has spaced apart generally cylindrical members 340 and second plate 334 has spaced apart generally cylindrical members 342. Cylindrical members 340 of first plate 332 are received between cylindrical members 342 of second plate 334. A pin 344 extends through the several cylindrical members 340 and 342 pivotally connecting first plate 332 to second plate 334. Partition 300 extends downwardly and forwardly into volume 284 through opening 286 to lower edge 312 at bottom 282 of bin 270 from mounting plate 316 affixed to hinge's 330 second plate 334 and extending upright along horizontal component 326 of support member 320. Hinge 330 enables partition 300 to pivot into and out of its normally lowered position lowered in bin's volume 284 through opening 286 in the directions of arcuate arrow G in FIG. 24.

Figure 22:
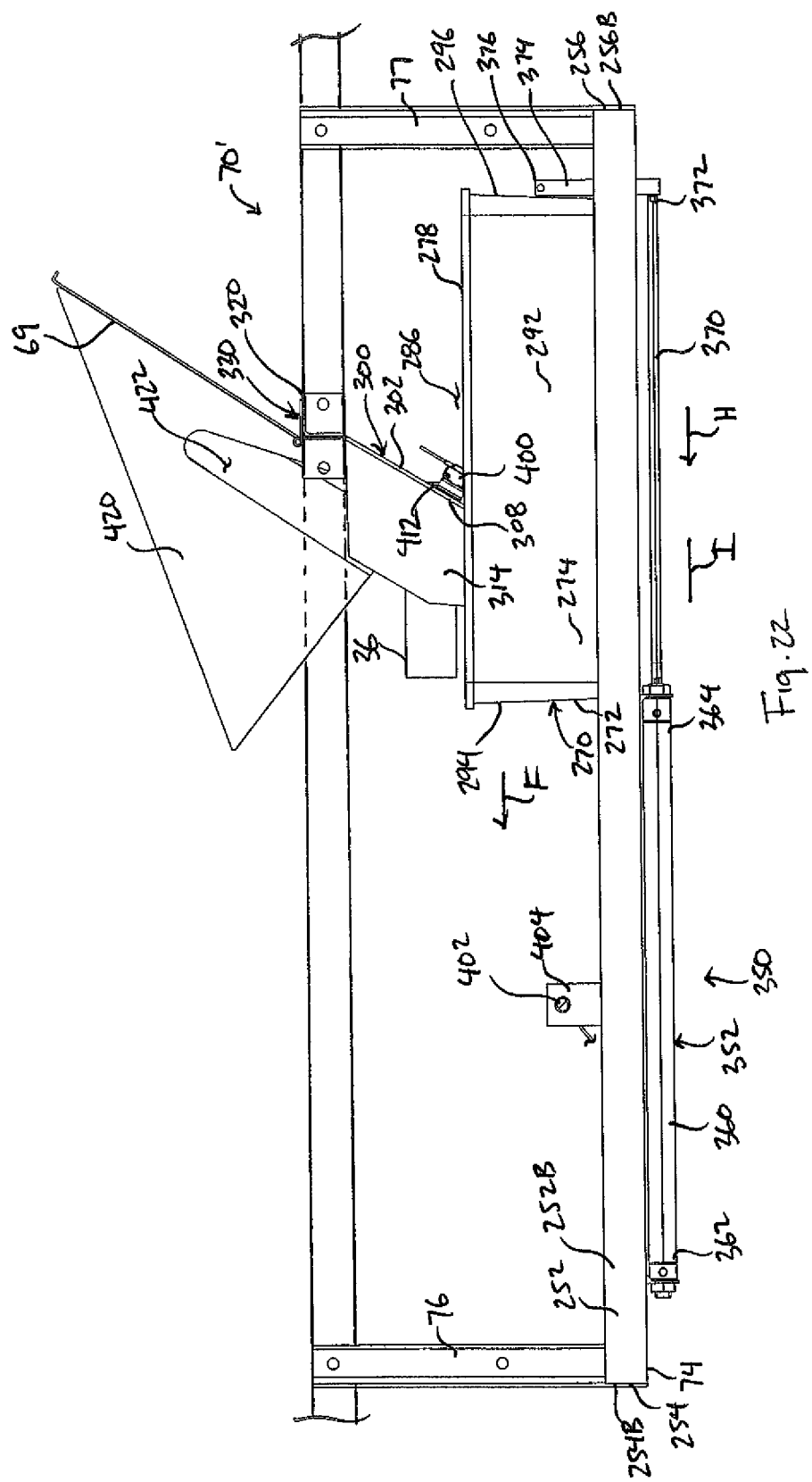
FIG. 22 is an outer side elevation view of the embodiment of FIG. 19.

Drive assembly 350 is operatively coupled to sensors 400 and 402 shown in FIG. 22. Drive assembly 350 is configured to selectively displace bin 270 longitudinally along path F when drive assembly 350 selectively actuates automatically each time sensor 400 in FIGS. 22, 23, 25, 26, 28, and 30 actuates, i.e., senses the presence of severed asparagus spears at a fill level of the confined volume 284A and issues an impulse effective upon drive assembly 350 in response. Drive assembly 350 is configured to automatically longitudinally displace bin 270 relative to partition 300 along path F between bin's 270 rearward and forward positions to enlarge confined volume 284A each time drive assembly 350 actuates under the influence of sensor 400. Sensor 400, a standard and readily-available position sensor or photosensor, is configured to sense the presence of severed asparagus spears at the fill level of confined volume 284A proximate to opening 286 to confined volume 284A and issue its impulse effective upon the drive assembly 350 in response. When an impulse from sensor 400 is effective upon drive assembly 350 in response to sensor 400 detecting the presence of severed asparagus spears at the fill level, drive assembly 350 automatically actuates. Sensor 402, also a standard and readily-available position sensor or photosensor, is configured to sense the presence of bin 270 at its "filled" station described below and issue an impulse concurrently effective upon the drive assembly 350 and an alarm 406 in FIG. 26 operatively coupled to sensor 402 in response. When an impulse from sensor 402 is effective upon drive assembly 350 and alarm 406 in response to sensor 402 detecting the presence of bin 270 at its filled station, drive assembly 350 and alarm 406 automatically actuate.

Figure 20:
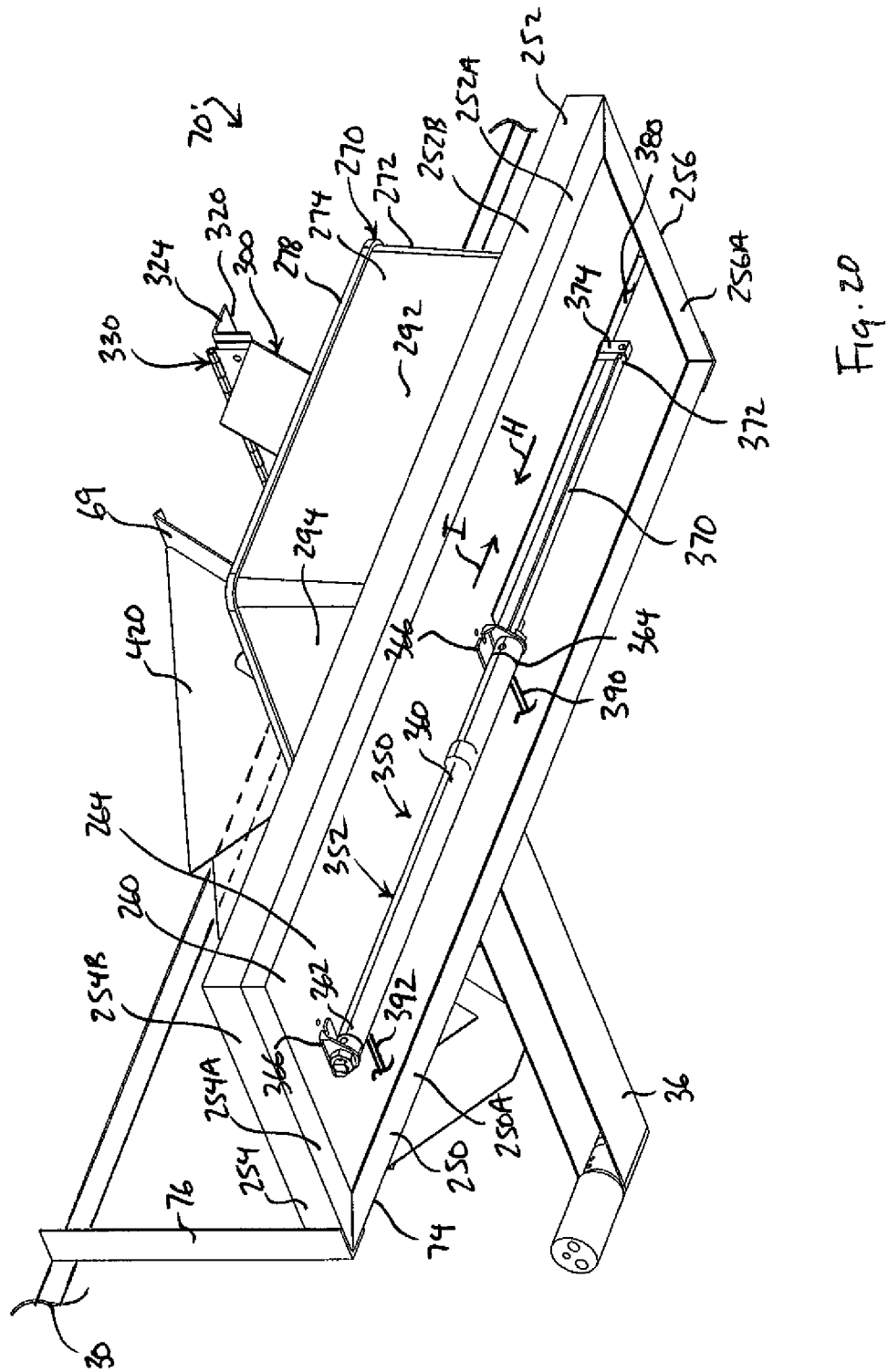
FIG. 20 is a bottom perspective view of the embodiment of FIG. 19.
Figure 26:
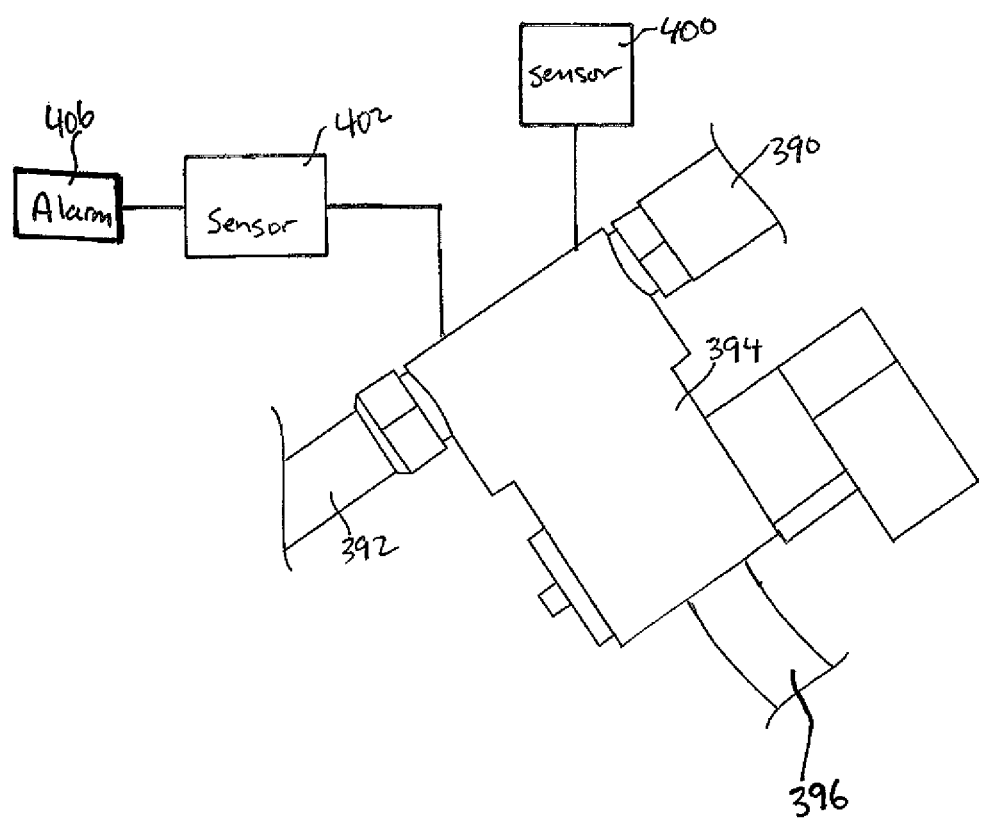
FIG. 26 is an enlarged fragmentary partially diagrammatic view illustrating two sensors wired to a valve unit, and an alarm wired to one of the sensors.
Figure 64:
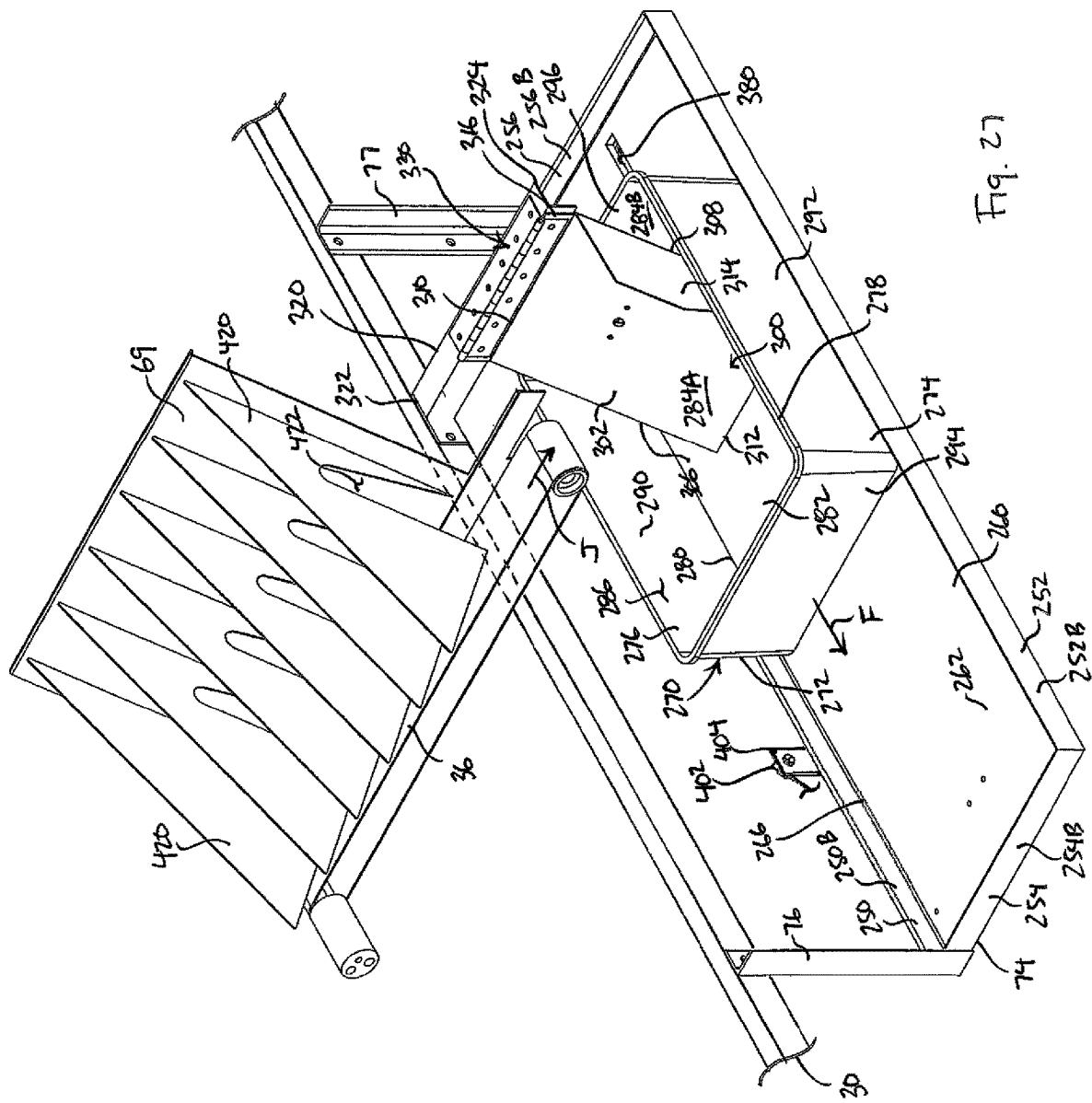

Drive assembly 350 includes a cylinder assembly 352 in FIGS. 20 and 22 and a valve unit 394 in FIG. 26 that operates cylinder assembly 352 under the influence of sensor 400 and under the influence of sensor 402 referenced in FIGS. 22 and 26. Cylinder assembly 352 is chosen because it is inexpensive, readily available, and reliable.

Referring in relevant part to FIGS. 20 and 22, cylinder assembly 352 is parallel to path F and includes cylinder 360 and operating rod 370 configured to operatively engage or otherwise couple to bin 270. Cylinder 260 has opposed first and second ends 362 and 364 and operating rod 370 has an outer end 372. Cylinder 360 is mounted rigidly at a fixed position to lower surface 264 of platform 260 by suitable brackets 366 secured between cylinder 360 and lower surface 274. In this example, a first bracket 366 adjacent to the first end 362 of cylinder 360 and a second bracket 366 adjacent to the second end 364 of cylinder 360 secure cylinder 360 to platform's 260 lower surface 264. Cylinder 360 is between and parallel to sides 250 and 252 of frame 74 and extends longitudinally from first end 362 near end 254 of frame 74 to second end 364 at an intermediate location between ends 254 and 256 of frame 74. Operating rod 370 mounted partially within cylinder 360 through second end 364 for reciprocal movement therein extends outwardly from second end 364 to outer end 372. Operating rod 370 is configured to retract inwardly into cylinder 360 in the direction of arrow H in FIGS. 20 and 22 and extend outwardly from cylinder 360 in the direction of arrow I in FIGS. 20 and 22. Outer end 372 is configured to operatively engage or otherwise couple to bin 270, wherein retracting movement of operating rod 370 into cylinder 360 in response to actuation of cylinder assembly 252 imparts corresponding movement of bin 270 along path F between its rearward station in FIGS. 19, 21, and 22 and its forward station in FIGS. 29 and 30.

Figure 23:
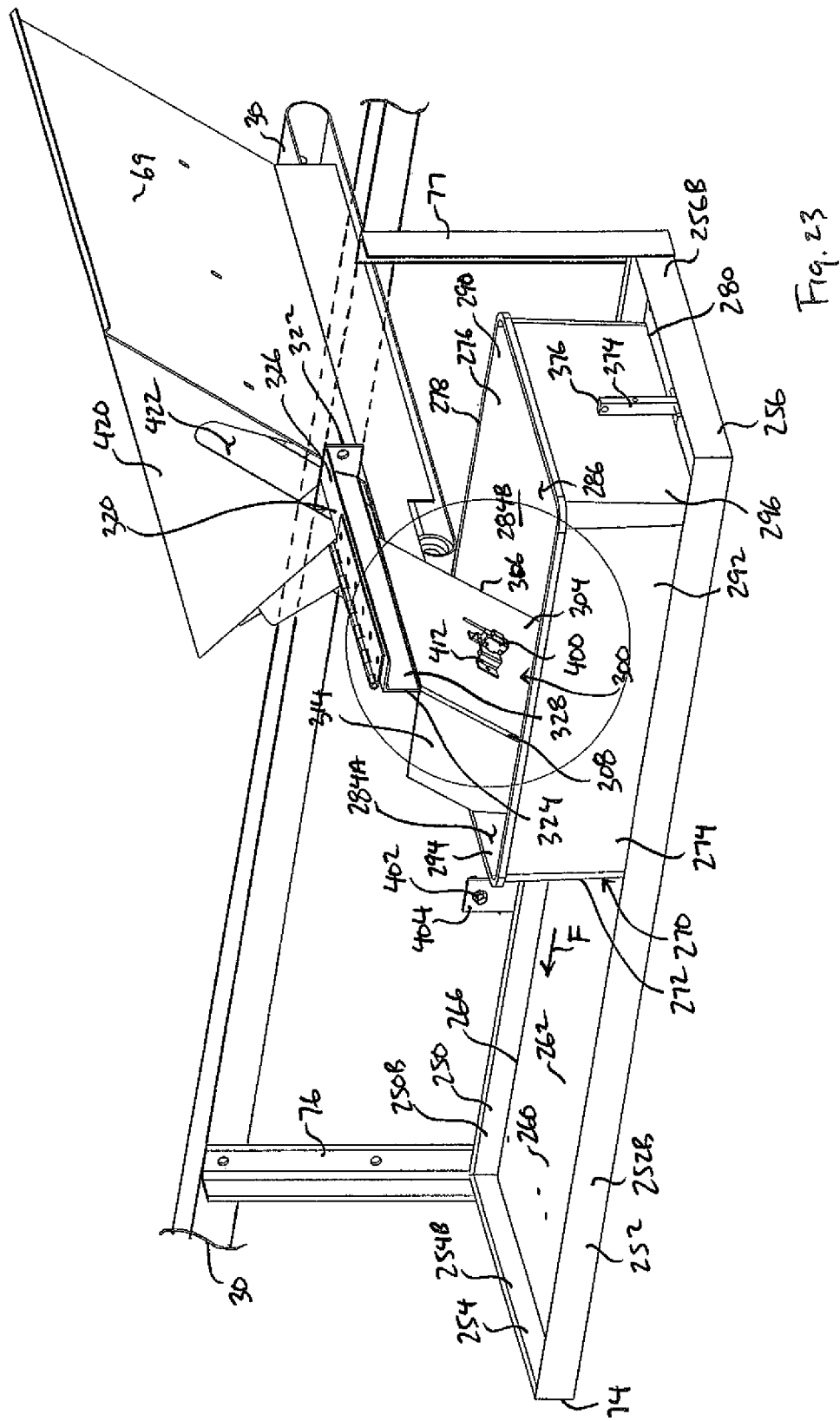
FIG. 23 is a rear perspective view of the embodiment of FIG. 19.

In this example, and in reference in relevant part to FIGS. 20, 22, and 23, outer end 372 is configured with a rigidly attached lug 374 configured to engage or otherwise couple to bin 270. Lug 374 interfaces between bin 270 outer end 372 of operating rod 370. A slot 380 extends through platform 260 from lower surface 264 to upper surface 262. Lug 374 translates longitudinally through slot 380 when operating rod 270 reciprocates into and from cylinder 360. Slot 380 is straight, elongate, narrow, parallel to sides 250 and 252 and to operating rod 370, and extends longitudinally over operating rod 370 from end 256 to adjacent to second end 364 of cylinder 260. Lug 374 is elongate and projects upright through slot 380 from lower surface 264 to upper surface 262 and beyond upper surface 262 to an upper end 376 opposing outer surface 274 of bin's 270 end wall 296 between upper and lower edges 278 and 280 and between end walls 290 and 292. The retracting operating rod 370 urges lug 274 in the same direction directly against outer surface 274 of bin's 270 end wall 296 in response to actuation of cylinder assembly 252 by valve unit 394 under the influence of sensor 400 urging or otherwise imparting the corresponding movement of bin 270 in the direction of path F between its rearward and forward positions.

Cylinder assembly 352 is a standard pneumatic cylinder assembly. Referring to FIGS. 20 and 26 in relevant part, conduits 390 and 392 couple cylinder 360 through valve unit 394 to the previously-described source 66 (FIGS. 1-5) of air under pressure via supply conduit 396. Valve unit 394 is operatively coupled by appropriate circuitry to sensor 400 referenced in FIGS. 22, 23, 25, 26, 28, and 30, and also sensor 402 in FIGS. 19, 23, 26, 27, 29, and 31, which is operatively coupled to alarm 406 in FIG. 26 by appropriate circuitry. Sensors 400 and 402 and alarm 406, a standard electronic audible alarm configured to sound an appropriately loud audible stimulus, are connected by appropriate circuitry to a source of power on chassis 30. Valve unit 394 operates actuating cylinder assembly 352 in response each time it receives an impulse from sensor 400 and each time it receives an impulse from sensor 402, characterizing the operative coupling of sensors 400 and 402 to cylinder assembly 352 of drive assembly 350.

Valve unit 394 is standard and well-known and configured to alternately switch into and out of an index position and a reset position from a normally closed position. Valve unit 394 switches into and out of its index position from its closed position under the influence of sensor 400, the fill sensor of apparatus 70'. Valve unit 394 switches into and out of its reset position from its closed position under the influence sensor 402, the reset sensor of apparatus 70'. Valve unit 394 isolates cylinder 360 from source 66 when valve unit 394 is in its closed position securing operating rod 370 relative to cylinder 360.

Valve unit 394 momentarily actuates, such as for approximately 1-3 seconds, into and out of its index position from its closed position in response to receiving an impulse from sensor 400. This momentarily supplies air under pressure from source 66 through conduit 390 actuating cylinder assembly 352 sufficiently to retract operating rod 370 inwardly into cylinder 360 in the direction of arrow H in FIGS. 20 and 22 as described herein. In other words, when an impulse from sensor 400 is effective upon valve unit 394 in response to sensor 400 detecting the presence of severed asparagus spears at the fill level, valve unit 394 automatically actuates as described herein.

Valve unit 394 momentarily actuates, such as for approximately 1-3 seconds, into and out of its reset position from its closed position in response to receiving an impulse from sensor 402. This momentarily supplies air under pressure from source 66 through conduit 392 actuating cylinder assembly 352 sufficiently to extend operating rod 370 outwardly from cylinder 360 in the direction of arrow I in FIGS. 20 and 22 as described herein. In other words, when an impulse from sensor 402 is effective upon valve unit 394 in response to sensor 402 detecting the presence of bin 270 at its filled station, valve unit 394 automatically actuates as described herein.

Alarm 406 also momentarily actuates, such as for approximately 1-10 seconds, in response to receiving an impulse from sensor 402. Each time alarm 406 actuates, it momentarily sounds an audible alarm that is sufficiently loud to enable it to be easily heard by an ordinary workman during harvesting operations. In other words, when an impulse from sensor 402 is effective upon alarm 406 in response to sensor 402 detecting the presence of bin 270 at its filled station, alarm 406 automatically actuates as described herein.

Bin 270 is set to its rearward position or station in FIGS. 19, 21, and 22 when operating rod 360 is in its extended position in FIGS. 20 and 22. Lug 374 is in its extended position when operating rod 370 is in its extended position.

Bin 270 is set to its forward position or station in FIGS. 29 and 30 under the influence of lug 374 when operating rod 370 is retracted to a retracted position in FIG. 30 from its extended position. Lug 374 is in a retracted position when operating rod 370 is in its retracted position corresponding to bin's 270 forward position. The retracting movement of operating rod 370 into cylinder 360 from its extended position in the direction of arrow H urges corresponding movement of lug 374 and bin 270 under the influence of lug 374 in the same direction. The extending movement of operating rod 370 from cylinder 360 from its retracted position in the direction of arrow I imparts corresponding movement of lug 374 in the same direction, but not bin 270.

Sensor 400 is configured to sense the presence of severed asparagus spears at the fill level of confined volume 284A and issue an impulse in response effective upon valve unit 394 for momentarily actuating cylinder assembly 352. Sensor 400 issues an impulse effective upon valve unit 394 each time sensor 400 senses the presence of asparagus spears at the fill level of confined volume 284A for a predetermined duration of time, from 2-3 seconds in a preferred embodiment, which prevents sensor 40 from issuing its impulse in response to sensing severed asparagus spears falling past sensor 400 into confined volume 284A through bin's opening 286 for less than the predetermined period of time. Drive assembly 350 actuates to displace bin 270 along path F to enlarge confined volume 284A each time an impulse from sensor 400 is effective upon it, namely, each time sensor 400 senses the presence of severed asparagus spears at the fill level of confined volume 284A for the predetermined duration of time and issues its impulse effective upon valve unit 394 in response. When sensor 400 senses the presence of severed asparagus spears at the fill level of confined volume 284A proximate to opening 286 to confined volume 284A in any station of bin 270, confined volume 284A is considered full of severed asparagus spears up to or near opening 286 and unsuitable to take in more severed asparagus spears without the chance of them falling outwardly from confined volume 284A through its opening 286.

Figure 25:
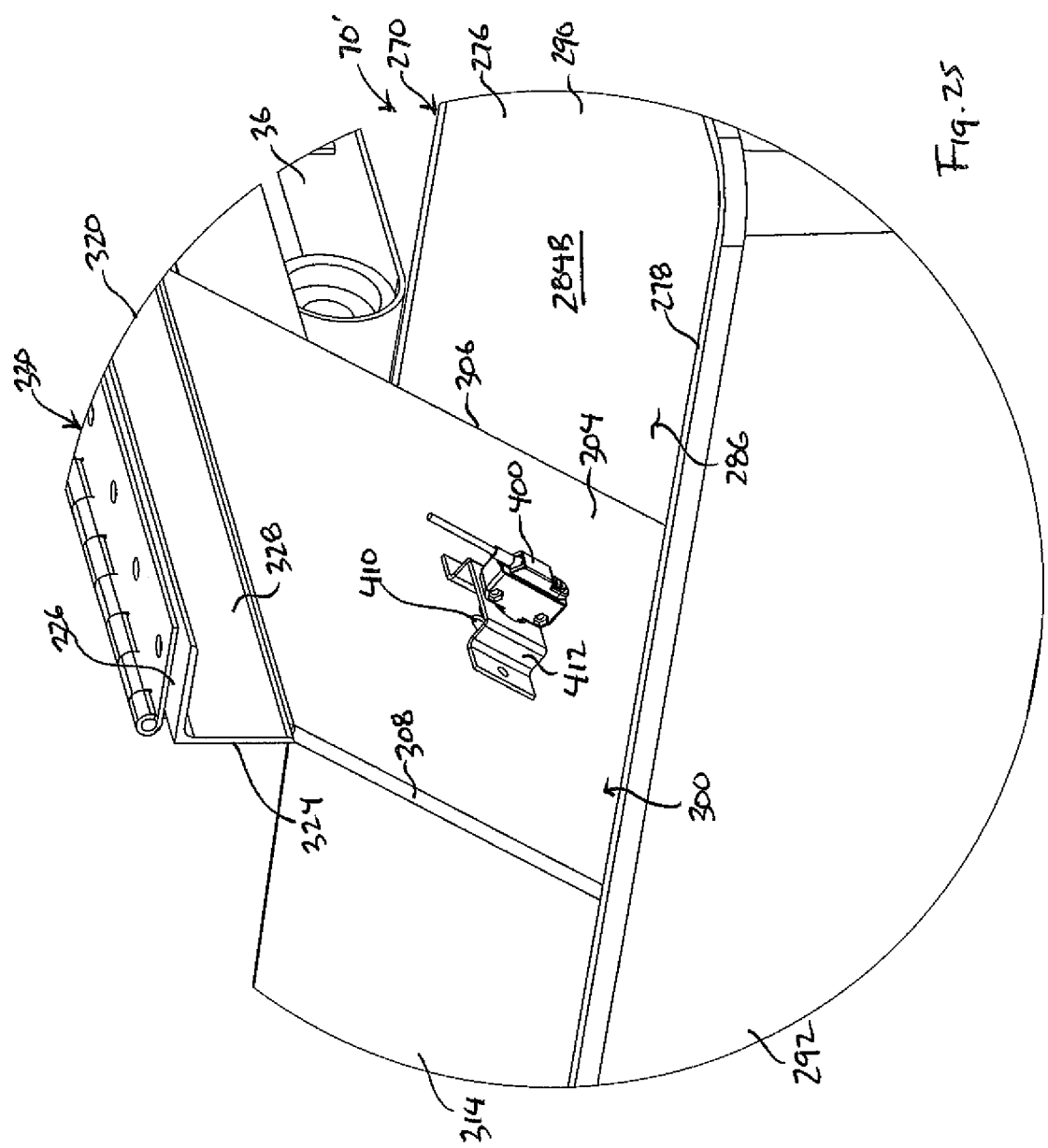
FIG. 25 is an enlarged view of a circled portion of the embodiment of FIG. 23.

Sensor 400 senses the presence of severed asparagus spears at the fill level of confined volume 284A via a hole 410 present through partition 300 from front surface 302 in FIGS. 19, 21, 24, 27 and 29 to rear surface 304 in FIGS. 23 and 25. Hole 410 is between side edges 306 and 308 of partition 300 at an intermediate location between side walls 290 and 292 of bin 270 and between upper and lower edges 310 and 312 proximate to opening 286 to volume 284. Hole 410 opens confined volume 284A proximate to opening 286 to sensor 400 located at a fixed position in confined volume 284B adjacent to partition's 300 rear surface 304 proximate to opening 286 to confined volume 284B, enabling sensor 400 to perform is described functions. In this example, a bracket 412 secured to rear surface 304 of partition 300 by welding, rivets, screws, or other suitable fasteners secures sensor 400 adjacent to rear surface 304 in opposition to hole 410. Hole 410 opens sensor 400 to confined volume 284A proximate to opening 286, enabling sensor 400 to sense the presence of severed asparagus spears at the fill level of confined volume 284A. The positioning of sensor 400 enables partition 300 to isolate sensor 400 from severed asparagus spears falling into confined volume 284A from conveyor 36, shielding sensor 400 from becoming damaged by severed asparagus spears falling past it into confined volume 284A through opening 286 from conveyor 36.

The general operation of harvester 20 configured with the described apparatus 70' begins with operating rod 370 extended to its extended position in FIGS. 20 and 22 and bin 470 appropriately located at its corresponding rearward station in FIG. 19 against lug 374. As chassis 30 advances along the rows of growing asparagus in the ground 22, asparagus spears become disposed in appropriate alleys between the appropriate plate 40 pairs. A pair of adjacent pick-up rollers 44 and 45 of each of pick-up beds 32A-32D concurrently relate to an alley and a corresponding severing assembly 50. For each alley and its corresponding severing assembly 50 and pairs of adjacent pick-up rollers 44 and 45 of pick-up beds 32A-32D between the severing assembly 50 and conveyor 36, either side of an asparagus spear that enters the alley and that is of a sufficient height to trigger the corresponding sensor is engaged by the pair of adjacent pick-up rollers 44 and 45 of the lowermost pick-up bed 32A, which exert an upward force on the asparagus spear sufficient to hold it without uprooting it, and upon being severed the severing assembly 50 is lifted upwardly thereby and handed off to and lifted in turn by the corresponding pair of adjacent pick-up rollers 44 and 45 of the succeeding pick-up beds 32B, 32C, and 32D, respectively, and ultimately cast onto conveyor 36 from the pair of adjacent pick-up rollers of the uppermost pick-up bed 32D and which transports it in the direction of arrow J in FIGS. 19 and 21 to confined volume 284A of bin 270. In this example, the asparagus spear is cast onto up-angled backstop 69 immediately to the rear of conveyor 36 and which slides down backstop 69 by gravity onto conveyor 36 that suitably operates to deposit the severed asparagus spears one after the other into confined volume 284A. When operating rod 370 is extended to its extended position in FIGS. 20 and 22 and bin 270 is set to its corresponding rearward position defining the smallest size of confined volume 284A open to receive asparagus spears from conveyor 36 through opening 286, brought into action are the following operations.

Conveyor 36 deposits severed asparagus spears into bin's 270 confined volume 284A through opening 286 while bin 270 is set to its rearward position. Backstop 314 adjacent to side wall 292 opposite to conveyor 36 deflects the severed asparagus spears into confined volume 284A from the conveyor 36, suitably consolidating the severed asparagus spears in volume 284A in an orderly stack of parallel severed asparagus spears. Valve unit 394 automatically moves into and out of its index position from its closed position when sensor 400 senses the presence of severed asparagus spears at the fill level denoted generally at FL in FIG. 19 and issues its impulse effective upon valve unit 394 in response as described above. This momentarily actuates cylinder assembly 352 sufficient to partially retract operating rod 370 in the direction of arrow H out of its extended position corresponding to the rearward station of bin 270 to an initially retracted position in FIG. 28. At the same time, lug 374 of the retracting operating rod 370 acting directly against bin 270 indexes or otherwise moves bin 270 longitudinally in the same direction along path F indexing it out of its rearward station to an advanced position or station in FIGS. 27 and 28 between bin's 270 rearward and forward stations. This increases the distance between front surface 302 of partition 300 and end wall 294, enlarging the size of confined volume 284A in response, enabling the deposited severed asparagus spears to settle under the influence of gravity in the now enlarged confined volume 284A to create more space for accepting additional severed asparagus spears from conveyor 36 during the harvesting operations. The distance between rear surface 304 of partition 300 and end wall 296 also concurrently decreases, decreasing the size of confined volume 284B in response. Conveyor 36 deposits severed asparagus spears into bin's 270 confined volume 284A through opening 286 while bin 270 is set to its advanced station ahead of its starting or rearward station. Backstop 314 adjacent to side wall 292 opposite to conveyor 36 deflects the severed asparagus spears into confined volume 284A from the conveyor 36, suitably consolidating the severed asparagus spears in the now enlarged volume 284A as before.

Next, valve unit 394 automatically moves into and out of its index position from its closed position when sensor 400 again senses the presence of severed asparagus spears at the fill level FL of confined volume 284A at bin's 270 advanced station in FIG. and issues its impulse effective upon valve unit 394 in response. This again momentarily actuates cylinder assembly 352 sufficient to partially retract operating rod 370 in the direction of arrow H out of its initially retracted position in FIG. 27 corresponding to the advanced station of bin 270 in FIGS. 27 and 28 to a further retracted position in FIG. 30. At the same time, lug 374 of the retracting operating rod 370 acting directly against bin 270 again indexes or otherwise moves bin 270 longitudinally in the same direction along path F indexing bin 270 out of its advanced station to its forward station in FIGS. 29 and 30. This again increases the distance between front surface 302 of partition 300 and end wall 294 again enlarging the size of confined volume 284A in response, enabling the deposited severed asparagus spears to settle under the influence of gravity in the now further enlarged confined volume 284A to yet again create more space for accepting additional severed asparagus spears from conveyor 36. The distance between rear surface 304 of partition 300 and end wall 296 concurrently decreases yet again, further decreasing the size of confined volume 284B in response. Backstop 314 adjacent to side wall 292 opposite to conveyor 36 deflects the severed asparagus spears into confined volume 284A from the conveyor 36 when bin 270 is in its rearward station, its forward station, and any station therebetween, consolidating the severed asparagus spears in volume 284A in an orderly stack of parallel severed asparagus spears. The described indexing of bin 270 from its rearward station to its advanced station and from there to its forward station serves to orderly arrange and consolidate the severed asparagus spears deposited in confined volume 284A by conveyor 36 in a stack of parallel severed asparagus spears.

Next, valve unit 394 automatically moves into and out of its index position from its closed position when sensor 400 yet again senses the presence of severed asparagus spears at the fill level FL of confined volume 284A at bin's 270 forward station in FIG. 29 and issues the impulse effective upon valve unit 394 in response. When sensor 400 senses the presence of asparagus spears at the fill level FL when bin 270 is set to its forward position, bin 270 is considered full and unsuitable for confined volume 284A taking on additional severed asparagus spears. The impulse from sensor 400 effective upon valve unit 394 again momentarily actuates cylinder assembly 352 sufficient to yet again partially retract operating rod 370 in the direction of arrow H out of its retracted position in FIG. 30 corresponding to the forward station of bin 270 in FIGS. 29 and 30 to yet a slightly further retracted position in FIG. 31. At the same time, lug 374 of the retracting operating rod 370 acting directly against bin 270 yet again indexes or otherwise moves bin 270 longitudinally in the same direction along path F slightly indexing bin 270 out of its forward station to its filled station in FIG. 31 triggering sensor 402 by it sensing the presence of bin 270 at its filled position.

Figure 31:
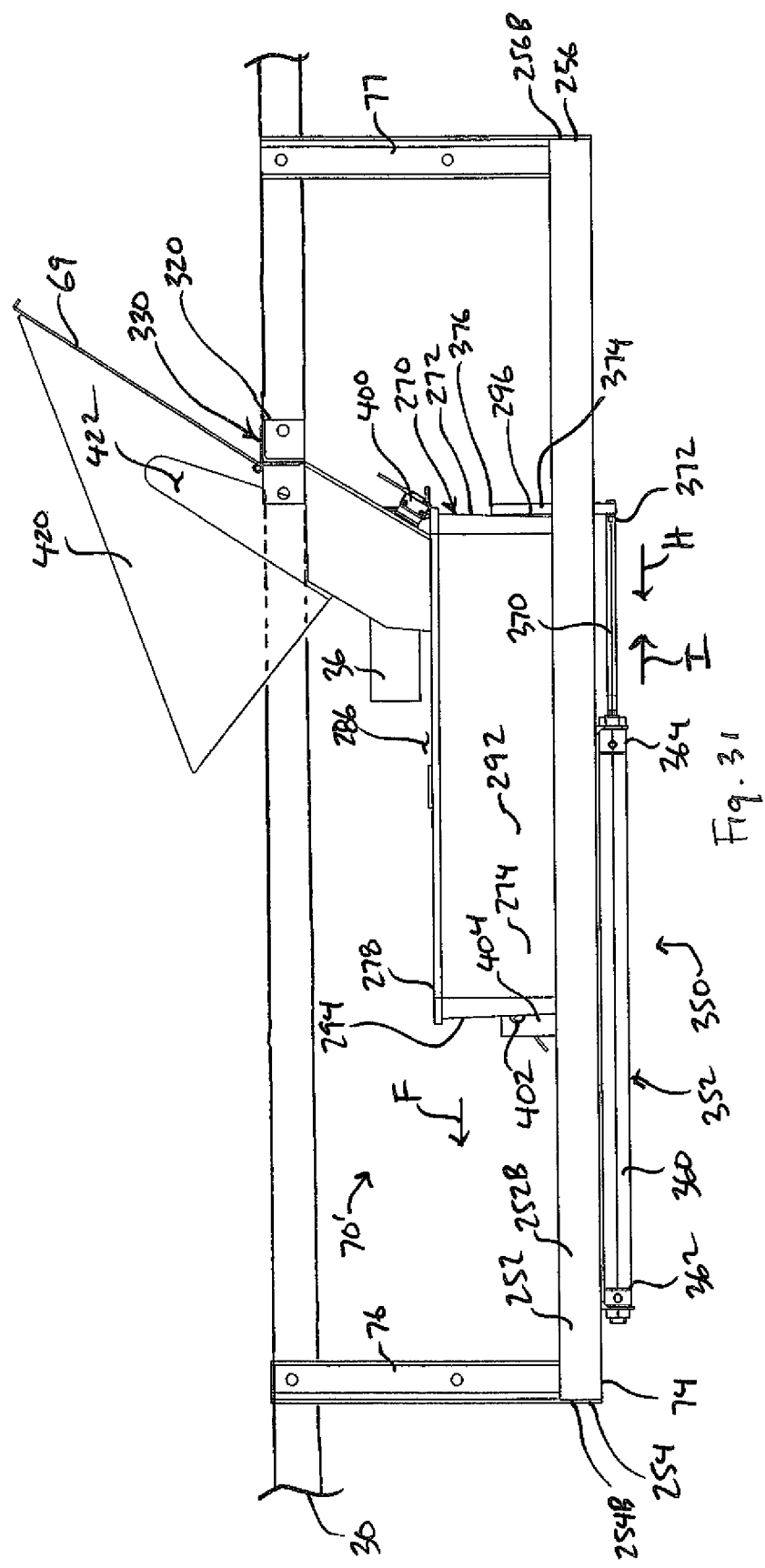

Upon bin 270 reaching its filled station in FIG. 31, sensor 402 is configured to sense the presence of bin 270 and issue an impulse concurrently effective upon valve unit 394 and alarm 406 in FIG. 26 in response. This momentarily and concurrently actuates cylinder assembly 352 and alarm 406. Cylinder assembly 352 momentarily actuates under the influence of sensor 402 sufficient to extend operating rod 370 in the direction of arrow I out of its retracted position in FIG. 31 corresponding to the filled station of bin 270 to its original or starting extended position in FIGS. 20 and 22, effectively returning or otherwise resetting operating rod 370 and its lug 374 to their extended positions. At the same time, alarm 406 momentarily actuates under the influence of sensor 402 sufficient to sounds its audible alarm that is sufficiently loud to enable it to be easily heard by an ordinary workman during harvesting operations, alerting the workman that bin 370 is full and ready to be taken away for further processing of its contents and that the installation of a fresh bin is required. Now that bin 270 is full of severed asparagus spears, a workman may carefully pivot partition 300 at hinge 330 upwardly from its normal lowered position while he removes the filled bin 270 from platform 260 and replaces it with a fresh bin by placing it on upper surface 262 of platform 260 and setting it to its rearward position against lug 374 as previously described. The workman lowers partition 300 into its normally lowered position into the fresh bin simply by pivoting it downwardly into the fresh bin at hinge 330 for resuming harvesting operations.

Sensor 402 is mounted at a fixed position between bin's 270 forward position and frame's 74 end 254 for enabling it to sense the presence of bin 270 at its filled position ahead of its forward position and issue its impulse concurrently effective upon valve unit 394 and alarm 406 in response. Sensor 402 issues its impulse concurrently effective upon valve unit 394 and alarm 406 each time sensor 402 actuates, namely, each time sensor 402 senses the presence of bin 270 at its filled position and issues its resulting impulse.

The operations of harvester 20 and its apparatus 70' repeat commensurate with continued harvesting operations. While apparatus 70' is configured to cycle or otherwise index bin 270 incrementally between a rearward station, one advanced station, and a forward station, effectively increasing the size of confined volume 284A twice, once at bin's 270 advanced station and a second time at bin's 270 forward station before bin 270 is subsequently indexed to its filled position, apparatus 70' can be configured to index bin 70 to a plurality of successively advanced stations between its rearward and forward stations, such as two or more successively advanced stations, for enlarging confined volume 284A incrementally two or more times between bin's 270 rearward and forward stations.

In FIGS. 19 and 20, backstop 69 associated with apparatus 70' is configured with a transverse series of dividing walls 420 defining alleys corresponding to the designated pairs of adjacent pick-up rollers 44 and 45 of the various pick-up beds 32A-32D. Dividing walls 420 have openings 422 that are open to conveyor 36 and up-angled forwardly 5-10 degrees from the 70-75 degree angle of backstop 69. Severed asparagus spears cast onto up-angled backstop into the various alleys slide down backstop 69 by gravity and pitch angularly downward through the various openings 422 and onto conveyor 36, which conveys the severed asparagus spears to bin 27. The angular displacement of backstop 69 and each opening 422 of the various dividing walls 420 serves to effectuate an orderly deposition of the asparagus spears onto conveyor 36.

As described above, cylinder assembly 352 operated by valve unit 394 is a preferred drive assembly 350 because it is inexpensive, readily available, and reliable. The positioning of cylinder assembly 352 causes operating rod's 370 extended position to correspond with bin's 270 rearward station and operating rod's retracted position to correspond to bin's 270 forward station. The orientation of cylinder assembly 352 is reversible for reversing its operation. In this latter embodiment, switching the direction of cylinder assembly 352 would cause the retracted position of operating rod 370 to correspond to bin's 270 rearward station and the extended position of operating rod 370 to correspond to bin's 270 forward station. While cylinder assembly 352 driven by valve unit 394 is a preferred drive assembly 350, hydraulic or gear-driven cylinder assemblies, geared drive assemblies, gear or cylinder-driven linkage assemblies, or other chosen drive assembly forms are useful in alternate embodiments.

As disclosed, bin 270 displaces slidably across upper surface 262 longitudinally along path F from its rearward station where confined volume 284A is smallest to its forward station where confined volume 284A is at its largest. Reversing the orientation of partition 300, bin 270, and frame 74, including its platform 260 and its attached cylinder assembly 352, would flip the stations. In such an alternate embodiment, bin 270 would be configured to displace slidably across upper surface 262 longitudinally along a displacement path between a forward station of bin 270, where the confined volume 284A would be at its smallest, and a rearward station of bin 270, where the confined volume 284A would be at its largest.

The present invention is described above with reference to illustrative embodiments. Those skilled in the art will recognize that changes and modifications may be made in the described embodiments without departing from the nature and scope of the present invention. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. In an asparagus harvester for harvesting asparagus spears growing in the ground and projecting upwardly therefrom in a path, the asparagus harvester comprising a chassis configured to be advanced over the ground along said path and supporting a pick-up apparatus for engaging and lifting the asparagus spears, a severing apparatus for severing the asparagus spears proximate to the ground, and a conveyor for receiving from the pick-up apparatus and conveying away severed asparagus spears severed by the severing apparatus, improvements therein comprising:
   a bin mounted displaceably adjacent to the conveyor;
   a partition in the bin, the partition and the bin defining a confined volume open to receive the severed asparagus spears from the conveyor;
   a drive assembly configured to displace the bin relative to the partition from a first station to a second station when the drive assembly actuates, the confined volume having a first size when the bin is at the first station and a second size when the bin is at the second station, the second size greater than the first size; and
   a sensor operatively coupled to the drive assembly, wherein the drive assembly actuates when the sensor senses a presence of severed asparagus spears at a fill level of the confined volume.

2. The improvements according to claim 1, wherein the partition includes an upper end and extends downwardly into the bin from said upper end mounted at a fixed position over the bin.

3. The improvements according to claim 1, wherein the sensor is mounted to the partition.

4. The improvements according to claim 3, further comprising:
   a hole through the partition from a first surface thereof facing the confined volume to a second surface thereof facing away from the confined volume;
   the sensor opposing the second surface adjacent to the hole; and
   the sensor open to the confined volume via the hole enabling the sensor to sense the presence of severed asparagus spears at the fill level of the confined volume.

5. The improvements according to claim 4, wherein the sensor is mounted to the second surface of the partition.

6. The improvements according to claim 1, wherein the drive assembly comprises a cylinder assembly comprising:
   a cylinder mounted at a fixed position; and
   an operating rod coupled to the bin and mounted partially within the cylinder for movement between an extended position corresponding to one of the first station of the bin and the second station of the bin and a retracted position corresponding to another one of the first station of the bin and the second station of the bin.

7. The improvements according to claim 1, further comprising:
   the confined volume flanked by a first side of the bin proximally to the conveyor a second side of the bin distally from the first side of the bin and the conveyor; and
   a backstop adjacent to the second side of the bin opposite to the conveyor, the backstop configured to deflect the severed asparagus spears into the confined volume from the conveyor.

8. The improvements according to claim 7, wherein the backstop extends from the partition.

9. In an asparagus harvester for harvesting asparagus spears growing in the ground and projecting upwardly therefrom in a path, the asparagus harvester comprising a chassis configured to be advanced over the ground along said path and supporting a pick-up apparatus for engaging and lifting the asparagus spears, a severing apparatus for severing the asparagus spears proximate to the ground, and a conveyor for receiving from the pick-up apparatus and conveying away severed asparagus spears severed by the severing apparatus, improvements therein comprising:
   a bin mounted displaceably adjacent to the conveyor;
   a partition in the bin, the partition and the bin defining a confined volume open to receive the severed asparagus spears from the conveyor;
   a drive assembly configured to displace the bin relative to the partition to enlarge the confined volume each time the drive assembly actuates; and
   a sensor operatively coupled to the drive assembly, wherein the drive assembly actuates each time the sensor senses a presence of severed asparagus spears at a fill level of the confined volume.

10. The improvements according to claim 9, wherein the partition includes an upper end and extends downwardly into the bin from said upper end mounted at a fixed position over the bin.

11. The improvements according to claim 9, wherein the sensor is mounted to the partition.

12. The improvements according to claim 11, further comprising:
   a hole through the partition from a first surface thereof facing the confined volume to a second surface thereof facing away from the confined volume;

the sensor opposing the second surface adjacent to the hole; and the sensor open to the confined volume via the hole enabling the sensor to sense the presence of severed asparagus spears at the fill level of the confined volume.

13. The improvements according to claim 12, wherein the sensor is mounted to the second surface of the partition.

14. The improvements according to claim 9, wherein the drive assembly comprises a cylinder assembly, the cylinder assembly comprising:

a cylinder mounted at a fixed position; and an operating rod coupled to the bin and mounted partially within the cylinder for movement between an extended position and a retracted position to displace the bin.

15. The improvements according to claim 9, further comprising:

the confined volume flanked by a first side of the bin proximally to the conveyor a second side of the bin distally from the first side of the bin and the conveyor; and a backstop adjacent to the second side of the bin opposite to the conveyor, the backstop configured to deflect the severed asparagus spears into the confined volume from the conveyor.

16. The improvements according to claim 15, wherein the backstop extends from the partition.

17. In an asparagus harvester for harvesting asparagus spears growing in the ground and projecting upwardly therefrom in a path, the asparagus harvester comprising a chassis configured to be advanced over the ground along said path and supporting a pick-up apparatus for engaging and lifting the asparagus spears, a severing apparatus for severing the asparagus spears proximate to the ground, and a conveyor for receiving from the pick-up apparatus and conveying away severed asparagus spears severed by the severing apparatus, a method, comprising:

mounting a bin displaceably adjacent to the conveyor;

locating a partition in the bin, the partition and the bin defining a confined volume open to receive the severed asparagus spears from the conveyor;

configuring a drive assembly to displace the bin relative to the partition between a first station and a second station when the drive assembly actuates, the confined volume having a first size when the bin is at the first station and a second size when the bin is at the second station, the second size greater than the first size;

operatively coupling the drive assembly to a sensor configured to sense a presence of severed asparagus spears at a fill level of the confined volume, the drive assembly configured to actuate when the sensor senses the presence of severed asparagus spears at the fill level;

the sensor sensing the presence of severed asparagus spears at the fill level; and in response the drive assembly actuating displacing the bin from the first station to the second station.

18. The method according to claim 17, wherein the step of locating the partition in the bin comprises mounting an upper end of the partition at a fixed position over the bin and extending the partition downwardly into the bin from said upper end.

19. The method according to claim 17, further comprising:

forming a hole through the partition from a first surface thereof facing the confined volume to a second surface thereof facing away from the confined volume;

locating the sensor adjacent to the second surface proximate to the hole; and the hole opening the sensor to the confined volume enabling the sensor to sense the presence of severed asparagus spears at the fill level of the confined volume.

20. The method according to claim 19, wherein the step of locating the sensor adjacent to the second surface proximate to the hole comprises mounting the sensor to the second surface proximate to the hole.

21. The method according to claim 17, wherein the step of configuring the drive assembly comprises:

providing a cylinder assembly comprising a cylinder and an operating rod mounted partially within the cylinder for movement between an extended position and a retracted position;

mounting the cylinder at a fixed position; and coupling the operating rod to the bin, the extended position of the operating rod corresponding to one of the first station of the bin and the second station of the bin and the retracted position of the operating rod corresponding to another one of the first station of the bin and the second station of the bin.

22. The method according to claim 17, further comprising configuring a backstop at a fixed position adjacent to the confined volume and opposing the conveyor, the backstop deflecting the severed asparagus spears into the confined volume from the conveyor.

23. The method according to claim 22, wherein the step of configuring the backstop at the fixed position adjacent to the confined volume and opposing the conveyor comprises extending the backstop from the partition.

* * * * *